United States Patent [19]
Blandford

[11] Patent Number: 5,347,579
[45] Date of Patent: Sep. 13, 1994

[54] PERSONAL COMPUTER DIARY

[76] Inventor: Robert R. Blandford, 1809 Paul Spring Rd., Alexandria, Va. 22307

[21] Appl. No.: 20,354

[22] Filed: Feb. 22, 1993

Related U.S. Application Data

[63] Continuation-in-part of Ser. No. 637,675, Jan. 7, 1991, Pat. No. 5,189,700, which is a continuation-in-part of Ser. No. 375,502, Jul. 5, 1989, abandoned.

[51] Int. Cl.$^5$ .......................... H04K 1/00; H04L 9/02; G06F 1/00
[52] U.S. Cl. ........................................ 380/25; 380/45; 395/425; 364/DIG. 1; 364/DIG. 2
[58] Field of Search .............................. 380/25, 23, 45; 364/DIG. 1, DIG. 2, 963.3, 956.1, 286.5, 253.3, 245.8, 246.9, 969.4; 395/425

[56] References Cited

U.S. PATENT DOCUMENTS

| Re. 32,655 | 4/1988 | Levine | 364/705.06 |
|---|---|---|---|
| 4,244,049 | 1/1981 | York et al. | 395/600 |
| 5,027,395 | 6/1991 | Anderson et al. | 380/4 |
| 5,150,407 | 9/1992 | Chan | 380/4 |

OTHER PUBLICATIONS

Central Point-Mac-Tools Deluxe; Central Point Software, Inc.; Beaverton, Oreg.; 1991; pp. 131-146 of manual.

Microsoft Word 4.0; Microsoft Corp.; USA; 1988; pp. 334-338 of manual.

Apple Macintosh System Software 6.0; Apple Computer, Inc.; 1988; Cupertino, Calif.; pp. 86-89, 117, 119, 120 of Elxer's Guide.

*Primary Examiner*—Stephen C. Buczinski
*Attorney, Agent, or Firm*—Donald W. Marks

[57] ABSTRACT

A computer diary archives a diary entry by creating, time stamping, authenticating and permanently storing a reference data block along with each diary entry. An archived diary entry can only be modified by placing original text within compartment codes, such as cross-out or tear-out codes, and by placing inserted text within insertion codes so that the original diary entry can be recreated from the modified diary entry. The reference data block, which can be the original diary entry, a canonical version of the original diary entry, or a one way fixed length encryption (hash) of the original diary entry, cannot be modified and is used to authenticate the original diary entry.

The diary program also monitors text entry for aliases and relative date phrases, and upon detection, prompts the user for entry or enters a specific identifier for each detected alias in an alias compartment or an absolute date for each relative date phrase in an implied date compartment in the diary entry.

30 Claims, 18 Drawing Sheets

| COMPARTMENT BOUNDARY CODES (296) | COMPARTMENT NAME (292) | PASSWORD (294) | TEXT DISPLAY (298) | COMPARTMENT COLOR (300) | COMPARTMENT PRIORITY (302) | MISSING TEXT INDICATOR (304) |
|---|---|---|---|---|---|---|
| - | MASTER MANUFACTURER | ARMADILLO (VALID/NOT_VALID) | | | | |
| [X] | CROSS-OUT | BEAR | ON | - | - | - |
| [I] | INSERTION | I | ON | - | - | - |
| [DI] | INSERTION_DATE | ID | OFF | - | - | OFF |
| [A] | ALIAS | AL | OFF | - | - | OFF |
| [ID] | IMPLIED DATE | DA | OFF | - | - | OFF |
| [T] | TEAR-OUT | (NOT AVAILABLE) | (NONE) | RED | HIGHEST | ON |
| [0] | DEFAULT | CAT | ON | BLACK | 1 | - |
| [1] | PATENT | DOG | OFF | BLUE | 2 | ON |
| [2] | FINANCES | EMU | OFF | BLACK | 2 | OFF |
| [3] | MOTHER | FOX | ON | GREEN | 4 | - |
| [4] | LINDA | GIRAFFE | OFF | PINK | 5 | OFF |
| [5] | THE_KIDS | FOX | OFF | BLACK | 1 | ON |

| TOGGLES | TEXT DISPLAY-ALL/RESET (314) | MISSING TEXT-ON/OFF/RESET (315) | COLORS-ON/OFF/RESET (316) |

FIG. 7

| CURRENT DATE: WED 17:11, 03 JUN 93 | | | | DIARY DATE: WED 09:37, 25 DEC 92 | |
|---|---|---|---|---|---|
| FILE IMPORT/ EXPORT | SETUP | SAVE | SEARCH & RETRIEVE | PRINT | COMPARTMENT | ARCHIVE RESTORE | EXIT |

CURSOR DATE: THU 11:31, 26 DEC 92 | CURSOR COMPARTMENTS: 0, DEFAULT; 1, INSERT

[0]⎿LAST_NIGHT⏌ ⎿WE⏌ [X]CLOSED[X] [1]OPE█ED[1] OUR PRESENTS.
             430                              432

[3]AROUND 11 THIS MORNING CALLED MOTHER FROM THE OFFICE.[3]
310 ──── [T73]

[5]THE KIDS ENJOYED THE RAILROAD.[5]

WE JUST FINISHED A DELICIOUS CHRISTMAS DINNER.

[1][5]THE TURKEY WAS STILL GOOD AT NEW YEAR'S, THE KIDS ATE IT ALL.[5][1]

IN THE EVENING WE ARE PLANNING TO GO TO A CONCERT AT CHURCH.[0]
[1]⎿MISSING⏌[1]
      312

[0]TOMORROW WE VISIT GRANDMA.[0]

IMPLIED DATE: TUE 24 DEC 92 | ALIAS: (0)FRED BROWN ... JAMES BROWN (2) FRED BROWN, HELEN BROWN
           418                                                                    442

FIG. 8

| DATE PHRASE | REFERENCE DATE | FORMULA NUMBER |
|---|---|---|
| YESTERDAY | (NONE) | 1 |
| LAST NIGHT | (NONE) | 1 |
| TOMORROW | (NONE) | 2 |
| DAY BEFORE YESTERDAY | (NONE) | 3 |
| TWO DAYS AGO | (NONE) | 3 |
| ... | ... | . |
| ... | ... | . |
| FIVE DAYS AGO | (NONE) | 6 |
| LAST THANKSGIVING | (NONE) | 7 |
| NEXT THANKSGIVING | (NONE) | 8 |
| LAST CHRISTMAS | DEC 25 | 9 |
| NEXT CHRISTMAS | DEC 25 | 10 |
| LAST XMAS | DEC 25 | 10 |
| LAST NEW YEARS | JAN 1 | 9 |
| NEXT NEW YEARS | JAN 1 | 10 |
| LAST WEEK ON MONDAY | (NONE) | 11 |
| ..... | .. | . |

BUILT-IN DATE WORD-PHRASE TABLE

FIG. 9

| DATE PHRASE | REFERENCE DATE | FORMULA NUMBER |
|---|---|---|
| MY NEXT BIRTHDAY | JAN 4 | 10 |
| MY LAST BIRTHDAY | JAN 4 | 9 |
| BILL'S NEXT BIRTHDAY | DEC 21 | 10 |
| BILL'S LAST BIRTHDAY | DEC 21 | 9 |
| MY NEXT ANNIVERSARY | MAY 1 | 10 |
| OUR LAST ANNIVERSARY | MAY 1 | 9 |
| ... | ... | . |

USER'S WORD PHRASE TABLE

BUILT-IN TABLE OF ALIAS WORDS

```
HE
SHE
IT
THEY         340
WE
HOME
MOTHER
  .
  .
  .
  .
```

FIG. 12

USER TABLE OF ALIAS WORDS

```
BILL
FRED        342
HELEN
SKEETER
  .
  .
  .
```

FIG. 13

344 — UNIQUE ALIAS IDENTIFIER TABLES

| WE |
|---|
| FRED BROWN, HELEN BROWN, BILL BROWN, JAMES BROWN |
| FRED BROWN, HELEN BROWN |
| FRED BROWN, BILL SMITH |
| U.S. CITIZENS |
| HOLIIN FOREST CITIZEN ASSOC. MEMBERS |

| IT |
|---|
| MY CAR |
| THE SITUATION |
| THE SMITH'S MARRIAGE |
| THE BIBLE |

| HE |
|---|
| GEORGE BUSH |
| CAR MECHANIC |

| BILL |
|---|
| BILL BROWN |
| BILL SMITH |
| WILLIAM SHAKESPERE |

| HOME |
|---|
| 17 ASHTON PLACE |
| GOLDEN SPUR MOTEL |

FIG. 14

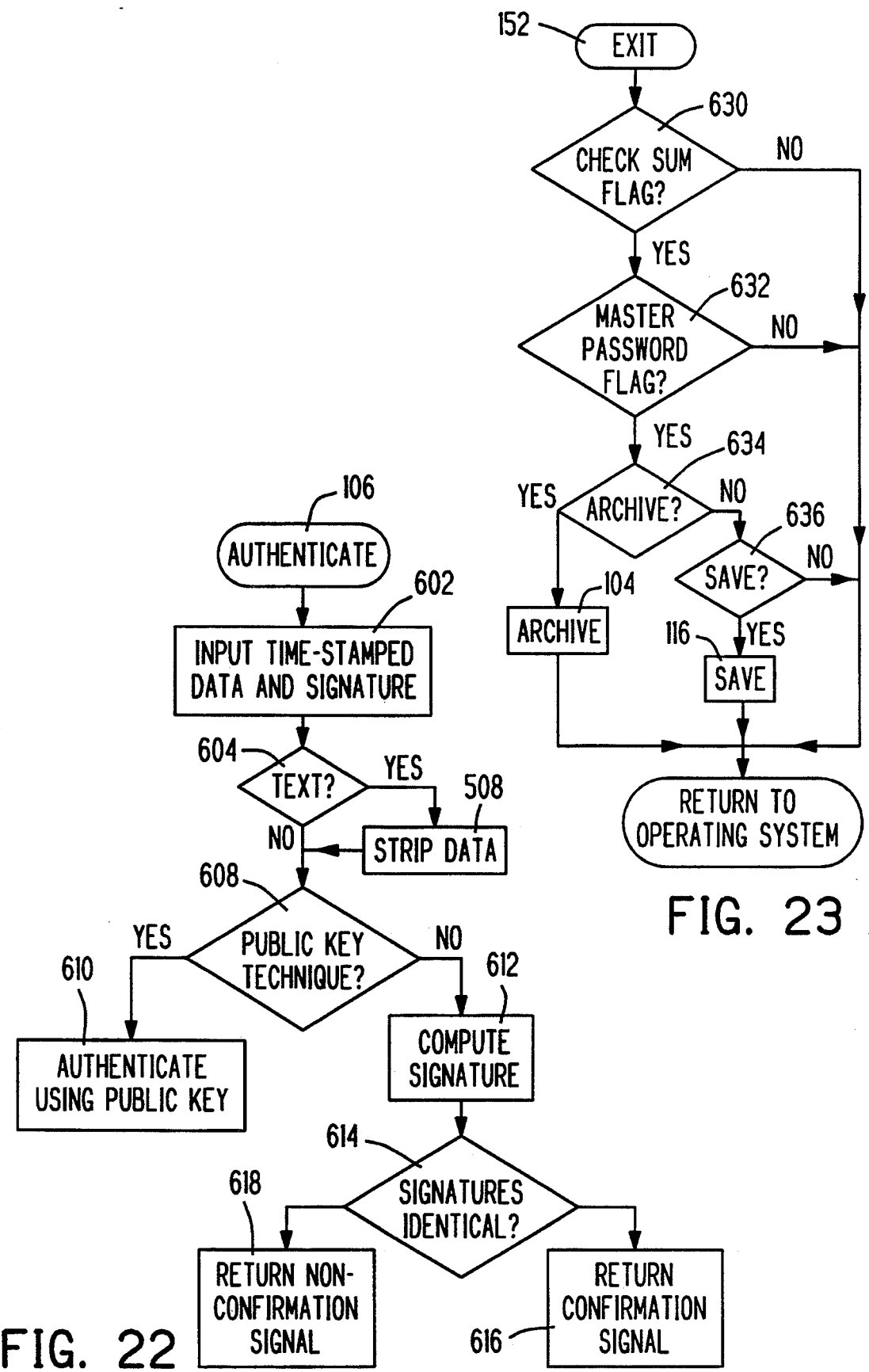

PERSONAL COMPUTER DIARY

CROSS-REFERENCE TO RELATED APPLICATIONS

This application is a continuation-in-part of copending U.S. patent application Ser. No. 07/637,675 filed Jan. 7, 1991, for DEVICES TO (1) SUPPLY AUTHENTICATED TIME AND (2) TIME STAMP AND AUTHENTICATE DIGITAL DOCUMENTS, now U.S. Pat. No. 5,189,700, which in turn is a continuation-in-part of copending U.S. patent application Ser. No. 07/375,502 filed Jul. 5, 1989 for AN ARCHIVAL, SECURE DIGITAL MEMORY SYSTEM, now abandoned; these applications No. 07/637,675 and No. 07/375,502 are hereby incorporated herein in their entirety by reference.

TECHNICAL FIELD

The present invention relates to archived record keeping systems, such as a diary, for computers.

BACKGROUND ART

For hundreds of years artists, writers, politicians, and private persons have kept dairies. The diaries have generally been hand-written in a bound notebook on consecutive pages on which the date is either pre-recorded or is entered by the diarist as the entries are made.

This traditional method of keeping a diary has several useful features for the diarist and for subsequent readers. The diarist cannot easily go back and alter what he has written. Thus the diary is more likely a truer record of what the diarist actually thought at the time. The diary is "time stamped." The diarist may ink out or tear out pages, but it is clear to future readers that this has been done; the existence of an original record is apparent along with its mutilation to indicate the intent of the mutilator to destroy a particular entry.

Only a proportionally small amount of text can be inserted at a later date, and this can possibly be detected by changes in ink or slight changes in handwriting, or by the fact that the additions have been written in the margin. To the degree that these changes can be detected the diary is tamperproof.

Any reader of the diary can be sure by the handwriting of the identity of the person who wrote the diary; that is, the diary can be verified to be authentic. The diary may be locked away so that it is private.

Attempts have been made to provide a computer diary. Many such diaries are business oriented, designed to serve as reminders and not as permanent records.

The Tandy corporation has marketed a software product named "My Personal Diary" which allows the user to type into the dated image of a page of a diary. Although the software controls access to the diary pages by use of passwords, it is possible for anyone with access to use the software to turn to any date in this diary, past, present, or future, and to delete and enter data at will. This is very unlike a real personal diary in that there is no way to determine if an entry for any date was written at any time close to that date or was written or changed months or years later.

SUMMARY OF INVENTION

In a first aspect, the present invention is summarized in a computer system for archiving data blocks wherein a modifiable or working version of an original data block is stored along with a write-once read-many (WORM) record containing the original data, a stripped version of the original data, or a hash signature of the original data together with the present date. Modifications to the working data blocks are made so that the modifications can be identified and removed or restored to recreate the corresponding original data block. The authenticity of the original data with its original entry date can be readily determined along with the subsequent modifications to the original data block.

In a second aspect, the invention is summarized in a computer diary wherein storage of an original diary entry along with the present date is prohibited when the present date is before the date of the previously stored diary entry.

In a third aspect, the invention is summarized in a computer diary wherein the forming and editing of diary entries includes monitoring the input of diary entries to identify entry of selected text entries or aliases having corresponding lists of one or more previously stored specific identifying terms, displaying the one or more of stored terms corresponding to the entered selected text entry to enable the diarist to identify a correct term for the alias, and placing the identified term in the diary entry.

In a fourth aspect, the invention is summarized in a computer diary wherein the entry of diary entries for corresponding diary dates is monitored for the input relational date entries, and the diary includes formulas for computing absolute dates corresponding to the identified selected relational date entries so that the computed absolute dates can be placed in the diary entry.

It is an object of this invention to supply a computer diary system which will not only have the distinctive and useful features of a traditional diary, but also have many of the useful features which are attainable only through the aid of modern computers.

Another object of the invention is a diary which is to be kept generally proof against a casual attack by a typical user and can be implemented using software. Such a system need not necessarily be secure against a determined attack by a computer system professional or by a dedicated "diary tampering" program written by such a professional.

A further object of the invention is a computer diary with word processing, text time-stamping and authentication, secure archiving, and selective access to different portions, or "compartments", of the diary.

One feature of the present invention is the possibility for the diarist to designate segments of text with beginning and ending codes signifying different compartments of the text wherein a piece of text may belong to several different compartments, each compartment can have its own password, and examination of the diary can be selectively restricted to users with knowledge of the appropriate set of passwords for the compartments of interest to them.

Advantages of the invention include that the diarist can control access to the diary, that the diarist, even though he is the owner of the system, cannot alter, change the date of, or erase data which is time-stamped, authenticated, and already stored.

Another feature of the invention is the provision of the capability to "tear-out" a limited amount of data per day by putting text into a tear-out compartment with a password which cannot be extracted from the computer diary by anyone, including the diarist. The diarist may, however, choose to keep a record of the tear-out password outside the computer diary if he so desires.

In a further aspect of the invention the diarist can enter a limited amount of annotation data to previous dates, and if desired by the diarist, such additions can be seen on display to be clearly distinct from data truly entered on that date by placing the annotation data in its own compartment with its own display defaults; the system ensures that the diarist is never able use the annotation capability to falsify the initial data to any person in possession of all the required passwords.

In a still further feature, the diary program ensures that data is never time-stamped with a date different from that of the current clock, nor with a time earlier than the most recent previous time a record was stored in the diary.

BRIEF DESCRIPTION OF DRAWINGS

FIG. 7 is a view of a computer display screen produced in the setup procedure of FIG. 6.

FIG. 8 is a view of a computer display screen produced in a main diary entry and editing procedure of FIG. 1.

FIG. 9 is a table of built-in relative date phrases with corresponding reference dates and references to formulas for computing absolute dates from the relative date phrases for use in the procedure of FIG. 17.

FIG. 12 is a table of built-in generic terms or alias words used in the computer diary program of FIG. 1.

FIG. 13 is a table of user generated generic terms or alias words used in the computer program of FIG. 1.

FIG. 14 is an example of an unique alias identifier table containing lists of specific terms which can be selected to specifically identify aliases in the tables of FIGS. 12 and 13.

FIG. 22 is a flow diagram of an authentication procedure used in the computer diary of FIG. 1.

FIG. 23 is a flow diagram of an exit procedure used in the computer diary of FIG. 1.

DESCRIPTION OF THE PREFERRED EMBODIMENTS

Figure 1:
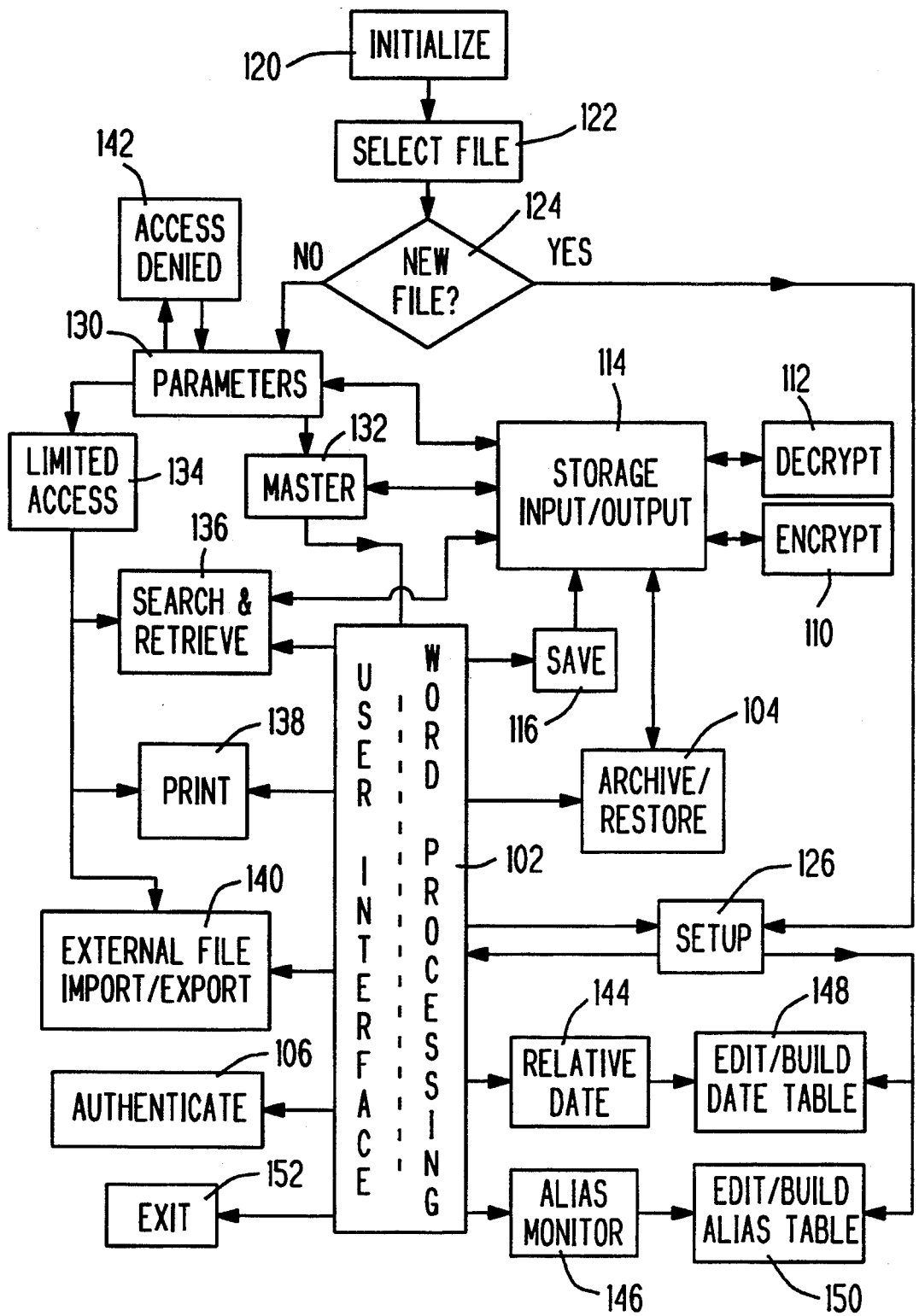
FIG. 1 is a general block diagram of major procedures included in one embodiment of a computer diary in accordance with the invention.

As shown in FIG. 1, a computer diary in accordance with the invention includes a word processing core 102 along with an archive function 104 by means of which a user can time stamp and store a diary entry. The word processing function 102 can only edit or modify an archived diary entry by marking archived diary text or by inserting marked text or other data so that the original archived diary entry can be reconstructed. Authentication by function 106 is by comparing the reconstructed text with a write-once read-many (WORM) version of the original diary entry or by comparing an encrypted hash signature of the reconstructed text and original date with a WORM hash signature of the original time stamped entry. Preferably the program includes encryption 110 and decryption 112 with storage input/output 114 (for example magnetic disk input/output) of diary entries and various file parameters. The user can save an incomplete diary entry with save function 116, without time stamping and archiving, for later recall and completion, but such incomplete diary entry is not accorded a time stamp.

The diary program begins with the initialization module 120 after which the user selects a file in function 122. The first time user of the diary selects a new file name which results in the program at 124 branching to a file setup function at 126. In file setup 126, the user enters several optional file parameters including a master password. The user can also designate user compartments or text markers with associated passwords for permitting others limited access to the diary file.

When a stored file is selected, the program branches at 124 to a function 130 where several file parameters previously created in setup 126, including the master password and any user compartment passwords are input from the file via the input/output 114. If the user correctly enters a master password at 130, then the program proceeds to the word processing and user interface 102 with full read/write access to diary entries in the file granted at 132. The master function 132 determines the existence of any previously saved but non-archived diary entry and inputs any such entry for display by the word processor user interface 102. In the absence of an uncompleted diary entry, the user interface is set for the user to enter a new diary entry.

If the user fails to enter the master password at 130, the user is queried to enter any user compartment passwords. Correct entry of one or more user compartment passwords results in the granting of limited read-only access at 134. The limited user is only permitted to input via storage input/output 114 those compartments (text previously marked by the master diarist) associated with correctly entered passwords. Also the limited user is permitted to search and retrieve 136, print 138, and to import and export 140 from and to an external text or data file. Other diary and word processing functions such as archive 104, storage output through input/output 114, save 116, setup 126, and other text editing and modification functions are not permitted to the limited user.

Failure to enter any correct password in procedure 142 results in access denied 142 and return to master password query.

The program includes monitoring procedures 144 and 146 for relative date phrases such as today, tomorrow, yesterday, last Sunday, etc., and for alias words such as pronouns like he, she, we, they, or user identified non-specific names or aliases such as first names like Bill, Susan, etc. When entry of a relative date phrase or an alias is detected, the program suggests insertion of a specific term, such as the precise date, or selection of a term from a table of terms such as full names of the possible aliases. Tables of relative date phrases, alias words, date formulas and specific terms, can be edited and created in procedures 148 and 150. Alternatively, the diarist can elect not to insert the absolute date or the specific term.

A user with master access options after electing exit function 152 is offered options to archive or save a diary entry if it was not previously archived or saved.

Figure 2:
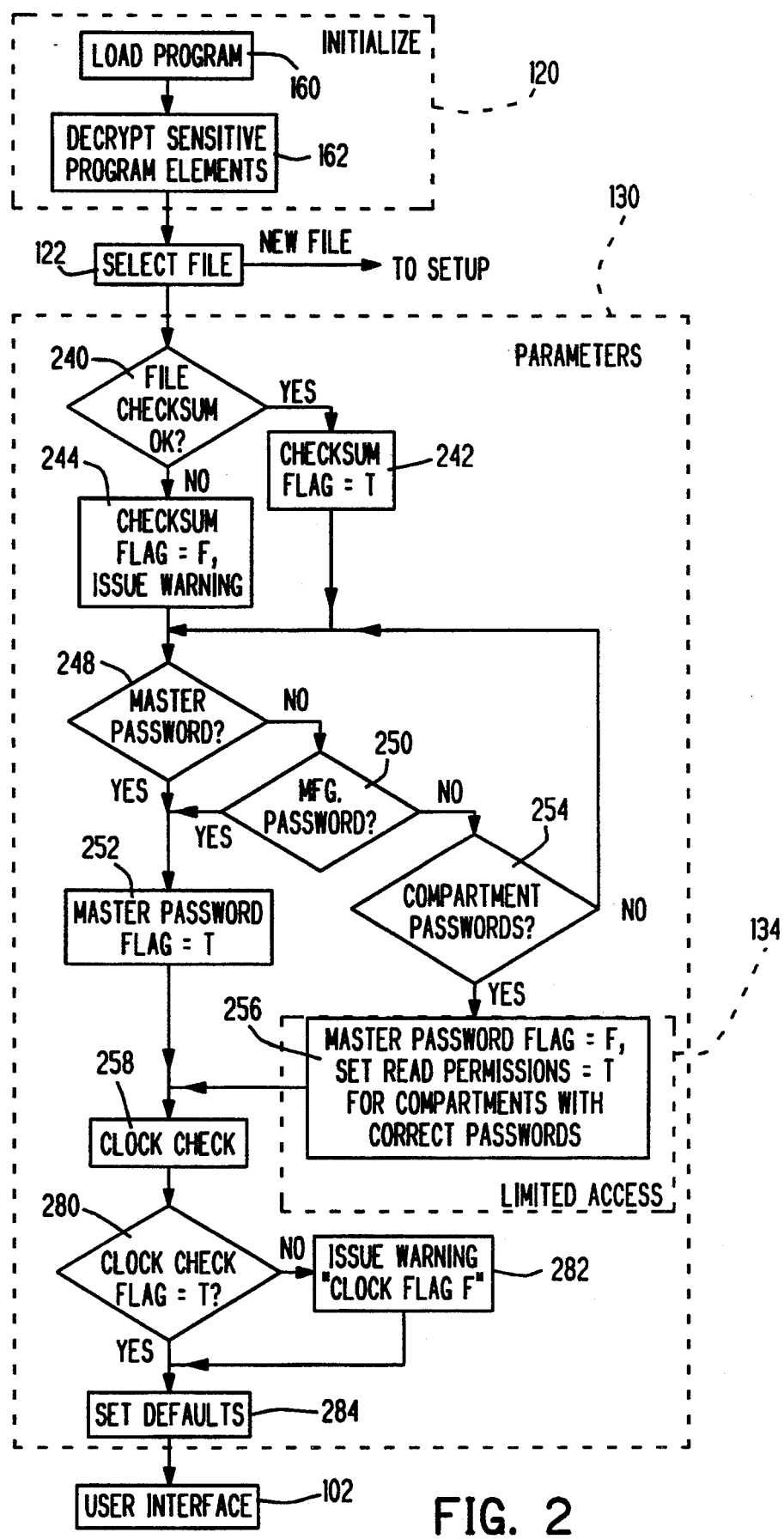
FIG. 2 is a flow diagram of initial procedures during startup of the computer diary of FIG. 1.
Figure 3:
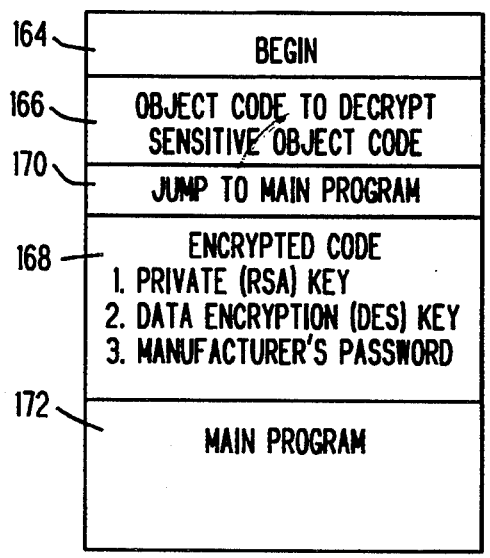
FIG. 3 is a general diagram of object code used in the computer diary of FIG. 1.

In the initialize procedure 120 as illustrated in more detail in FIG. 2, the program is first loaded in step 160 and then sensitive program elements in the program are decrypted in step 162. FIG. 3 shows the structure of the object code in which, immediately after control is passed to the loaded program at 164, control proceeds to decryption code 166 which decrypts sensitive data 168 which for example includes a secret, private (RSA) key, a data encryption (DES) key, and a manufacturer's password and places the decrypted data in operating condition with the rest of the object code. The elements 168 are encrypted with a conventional data encryption standard (DES) by the program manufacturer who includes the decryption code with its key in the program code 166. The purpose of the encryption of program elements 168 is to make it more difficult for someone to falsify authentication or to alter the archive file by decrypting, altering, and re-encrypting with another program. The program then jumps at 170 to the main part 172 of the program where in step 122, FIGS. 1 and 2, a file is selected.

Figure 4:
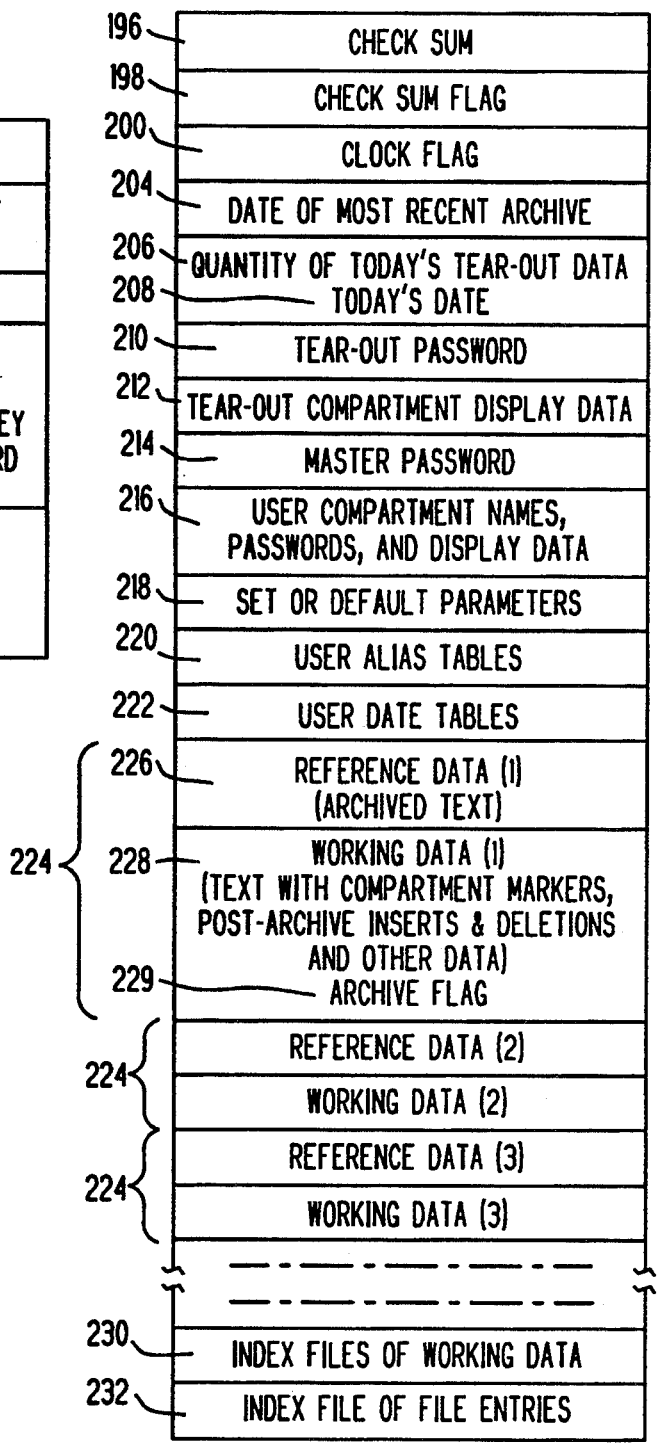
FIG. 4 is a general diagram of contents of a diary file produced and stored by the computer diary of FIG. 1.

The file structure, shown in FIG. 4, includes a check sum 196 which can be produced by conventional summing, cyclic redundancy check, cryptographic secure hash procedures or the like; a check sum flag 198; a clock flag 200; the date 204 of the most recent archive; the quantity 206 of today's tear-out data together with today's date 208; the tear-out password 210; tear-out compartment display data 212 such as whether an tear-out indicator with the number of words in the tear-out section or compartment is displayed; the master password 214; user compartment names, passwords, and display data 216; set or default parameters 218 which determine the display of built-in compartments or marked text such as cross-outs, inserts, implied dates, implied alias, etc.; user alias tables 220; user date tables 222; diary entry sections 224 for each archived diary entry including reference or WORM data 226 and working or read/write data 228 with archive flag 229; an index file 230 of all the working data including all text words (except for defined trash words like "a", "the", "and", "or", etc.), implied dates, implied alias terms, and compartment or text marking codes; and an index file 232 of the diary entry sections 224 with their archive date of entry.

Referring back to FIG. 2, the program in step 240 recalculates the checksum of the file and compares this checksum number with the checksum number 196 stored in the file. If these checksum numbers are equal, the program branches to step 242 where a checksum flag is set true (T); otherwise the checksum flag is set false (F) in step 244 indicating that the stored file has been corrupted by use of some other program. A warning is issued if the checksum flag is F because the diary program will not permit further archiving to this archive file. In this case the diarist may choose to access a backup copy of the archive file in hopes that it will pass the checksum test.

The user is requested in step 248 to enter a master password which is compared to the master password 214 read from the file of FIG. 4. If they do not match, then the user is given the opportunity to enter a manufacturer's password in step 250. The manufacturer's password is revealed to the user when the user calls the manufacturer and is properly identified (for example, by giving the maiden name of the user's mother as written by the program purchaser on the user licensee registration card). Thus should the registered user forget the master password, full access can be obtained by calling the manufacturer. Master access is granted in step 252 when either step 248 or 250 are true.

The diarist may grant limited access to selected data or marked text in the file by giving a limited viewer the compartment password of the corresponding data or marked text. When the limited viewer fails to enter either the master or the manufacturer's password, the limited viewer can enter a compartment password or passwords in step 254. If the entered password or passwords match one or more compartment passwords recorded in section 216 of the file, then in step 256, limited access is granted by setting the master password flag to F and a compartment read flag or flags to T for all compartments having the correctly entered password or passwords. Failure to enter any correct password results in the step 254 being false and returning to step 248.

Figure 5:
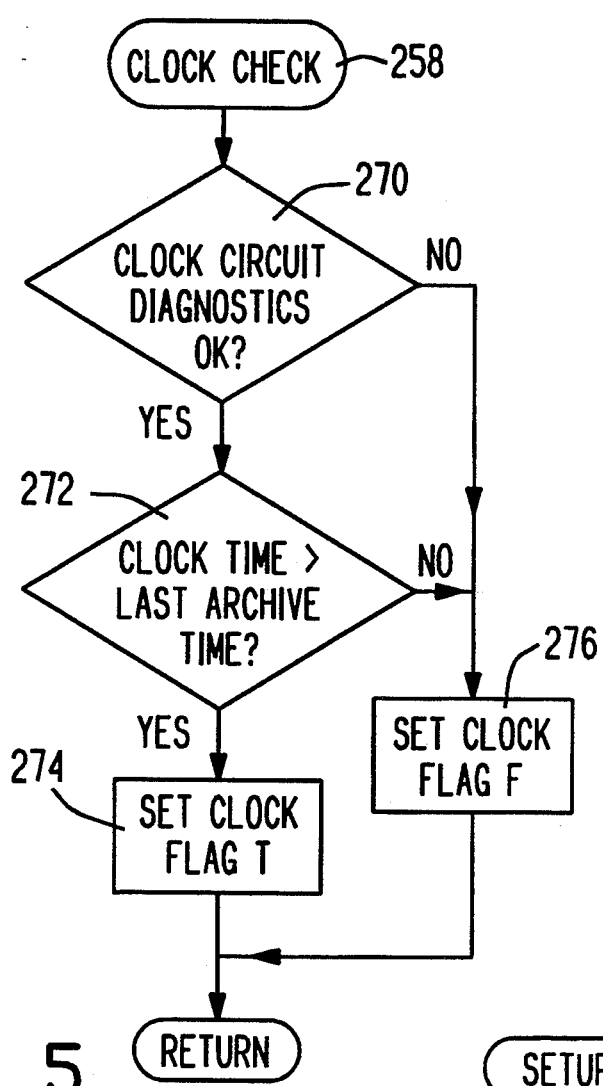
FIG. 5 is a flow diagram of a clock checking procedure used in the initial procedures of FIG. 2.

When either full or limited access has been granted by either step 252 or step 256, the program performs the clock check routine 258 which, as shown in FIG. 5, first checks the clock circuit for failures in step 270. If a conventional computer clock circuit is used, loss of battery power or other clock malfunction will normally indicate a failure, and if a secure clock is employed, such clock will normally include one or more checking functions to insure that the clock is operating properly and has not been tampered. If the clock diagnostic check test in step 270 is true, then the clock time is compared in step 272 with the last archive time 204 recorded in the file of FIG. 4. This step checks for changing of the clock time; for example the clock circuit on most computers can be set to any previous time by the computer setup procedure to attempt to falsify the date of a diary entry. When the clock time is greater than the recorded last archive time then the clock flag is set to T in step 274. If either step 270 or step 272 are false then the clock flag is set to F in step 276. Referring back to the procedure of FIG. 2, the setting of the clock flag to F in procedure 258 results in the program branching at step 280 to step 282 where the user is warned that no further archiving to the file is permitted because of the clock failure or incorrect date.

In step 284, the program reads the set or default parameters 218 for the file of FIG. 4 and sets the computer display in accordance with the read parameters. The program then proceeds to the user interface of the word processing program 102.

Figure 6:
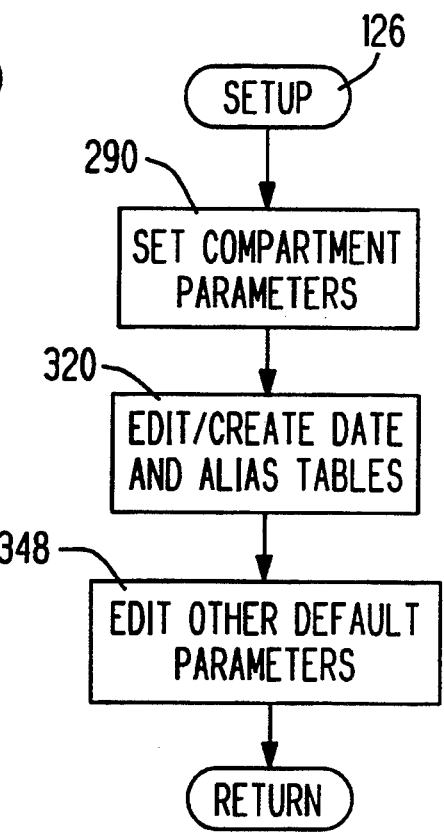
FIG. 6 is a flow diagram of a setup procedure of the computer diary of FIG. 1.

The setup procedure 126 which is called when a new file is selected during program startup or can be called from the user interface is shown in FIG. 6. In step 290, the user is given the opportunity to set various system and compartment parameters. As illustrated in the display screen shown in FIG. 7 and used for setting the parameters, there are a variety of "compartments" listed in the second column 292 including "CROSS-OUT", "INSERTION", "INSERTION_DATE", "ALIAS", "IMPLIED DATE", "TEAR-OUT", "DEFAULT", "PATENT", "FINANCES", "MOTHER", "LINDA", and "THE_KIDS". The listed "MASTER" and "MANUFACTURER" are not compartments but are included because of their password functions. The first nine listed compartments including "CROSS-OUT", "INSERTION", "INSERTION_DATE", "ALIAS", "IMPLIED DATE", "TEAR-OUT", and "DEFAULT" are system compartments while the last five listed compartments "PATENT", "FINANCES", "MOTHER", "LINDA", and "THE_KIDS" are examples of user created compartments. User compartment names can be changed, added, and deleted in the setup procedure, but modification of the listed system compartment names is not permitted.

In the third column 294, passwords for the various compartments are listed, except that the manufacturer's password is never available to the user in setup and the tear-out password is only available during the setup of a new file or until changed from a default (a default tear-out password such as "PASS" is recognized by the software for being displayed and changed but any other tear-out password can not be displayed or changed). During the setup of a new file the entry of a "MASTER" password is required. The manufacturer's password can be invalidated by depressing the "alt" and the "i" keys simultaneously while the cursor rests in the manufacturer's password row and column in FIG. 7. This causes the manufacturer's password to be replaced by the DES encryption of a user-input value using the secret DES key, and the entry in the password column for MANUFACTURER to change from "valid" to "not valid." The program provides no capability to replace the new entry in the manufacturer's password location with another value, nor to change the flag from "not valid" to "valid." These procedures make it impossible for the diarist or the manufacturer to know the new value in the manufacturer's password location by themselves; although it is still possible that in collaboration they could do so if the diarist retains a record of his input. The passwords for the other listed system compartments "CROSS-OUT", "INSERTION", "INSERTION_DATE", "ALIAS", "IMPLIED DATE", and "DEFAULT" can be changed from default words while entry of passwords for user created compartments "PATENT", "FINANCES", "MOTHER", "LINDA", and "THE_KIDS" are required when the user creates the compartment.

In the first column 296 are listed the compartment boundary codes by which the text segments or compartments are marked. The program employs the ASCII coding scheme for eight-bit bytes ranging from decimal 32 to decimal 127, and the boundary codes are selected from the remaining codes from decimal 0 to 31 and from decimal 128 to 255. Codes within these latter two ranges and which are not reserved for compartment boundary markers can be used for print or display formatting or for displaying various foreign and other characters and symbols in accordance with one or more of the conventional symbol sets employed in computers and printers. The boundary codes for the system compartments are fixed by the program and the program assigns boundary codes to user compartments as they are created. In the display, the boundary codes are displayed as reverse image characters, or characters with selected background and foreground colors. The boundary codes are placed at the beginning and end of a text segment to mark that text segment as comprising a compartment; for example in FIG. 8 the boundary code for the default compartment " ¦0¦ " placed at the beginning of the text before "Last" and after "church." to define a segment of the text from "Last" through "church." as belonging to the "DEFAULT" compartment. It is noted that compartments can be nested, that is, a compartment can defined for all or a portion of the text contained within another compartment.

Referring back to FIG. 7, the fourth column 298 is set by the user to indicate whether the compartment is to be displayed except that the tear-out compartment is normally not available for being displayed as indicated by the word "none". The tear-out compartment can only be displayed under limited access granted by steps 254 and 256 of FIG. 2 after entry of the correct password for the tear-out compartment. When the text display for a defined compartment is set to "ON" in column 298, then the text within that compartment is displayed in the word processing screen of FIG. 8 with the corresponding compartment boundary codes, and when set to "OFF", then neither the text nor boundary markers are displayed in the word processing screen even if the required passwords have been entered.

The diarist can select the color of the text displayed within in a compartment, where a color computer monitor is employed, as shown in column 300 of FIG. 7. Priority of the compartments is set by the diarist in column 302. The color actually used, if text is in more than one compartment, is in accordance with the compartment with the highest priority, given in column six 302. If the two nested compartments have equal priorities, the color of the compartment closest to the top of the list is used. However, the tear-out compartment always has the highest. The compartments above the tear-out compartment in FIG. 7 have neither independent color nor priority, as indicated by the dashes, since they are always within another compartment, and thus are given the same color and priority as the compartment of the text within which they are placed.

The last column 304 in FIG. 7 enables the user to set a missing text indicator in the event that the text display for that compartment is "OFF". For example, the missing text indicator for the TEAR-OUT compartment is "ON" in FIG. 7 and in FIG. 8, text in the tear-out compartment is indicated at 310 by " ¦T73 ¦ ". The indicator "T" is the boundary code indicator, see column 296 in FIG. 7, for the tear-out compartment, and the number 73 indicates that 73 words are in the tear-out compartment. Only for text missing because it has been torn out is the amount of text (73 words in this case) indicated. A missing text indicator 312 shows that patent compartment (code ¦1¦ ) contents are missing. However, there is no indication of how much text is missing.

Figures 10, 11:
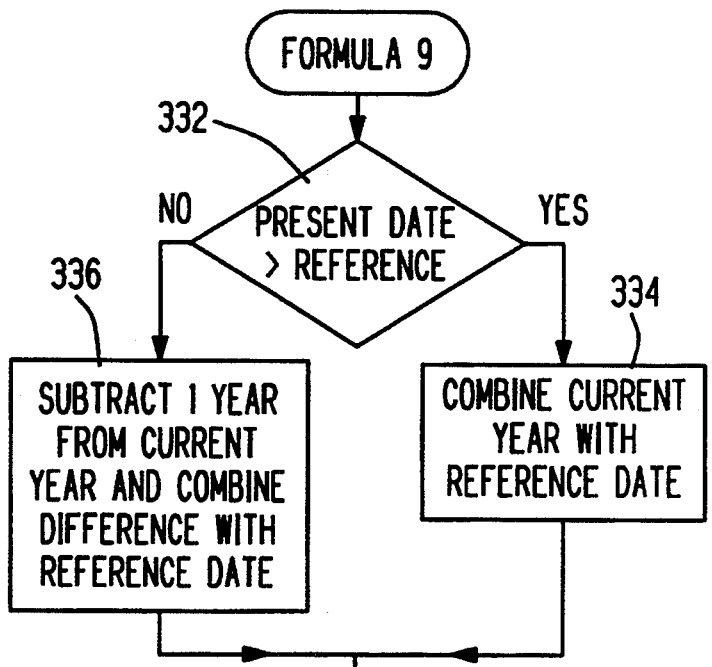
FIG. 10 is a table of user created relative date phrases with corresponding references to formulas for computing absolute dates from the relative date phrases similar to FIG. 9 but which can be created during the setup procedure of FIG. 6.
FIG. 11 is a flow chart of one possible formula for computing absolute dates from relative date phrases referred to in the tables of FIGS. 9 and 10.

After the compartment parameters have been set and saved by the step 290 in the setup procedure of FIG. 6, the program proceeds to the edit/create date and alias table functions in step 320. A built-in date word phrase table 322 is shown in FIG. 9; this table is built into the object code and can not be edited by the user. The built-in date phrase table 322 contains common relative date terms illustrated in column 324 such as "yesterday" "last night" "tomorrow", "today", "this morning", "Thanksgiving" "Christmas" etc. together with a possible reference date in column 326 and a formula index number in column 328. The formula pointed to by each formula index number 328 calculates an absolute date, for example "25 DEC 1992", for the corresponding relative date phrase 324 "last Christmas" using the present clock date and the reference date 326 when required. For example the formula for "last Christmas" as shown in FIG. 11 first determines in step 332 if the present month and day-of-month is greater than the reference date for the current year, and if so, combines the present year with the reference date in step 334, otherwise the previous year is combined with the reference date in step 336. Formulas for other relative date phrases can be easily composed by a skilled programmer.

A user's date word phrase table 222, stored in the file of FIG. 4, is shown in FIG. 10 and contains date phrases, reference dates and formula numbers entered by the user in step 320 of FIG. 6. Typically this user's date phrase table contains birthdays and anniversaries of the diarist, relatives and friends and other important dates. The user's date phrase table of FIG. 10 is used in the same manner as the built-in date phrase table of FIG. 9.

A built-in alias word table 340 is shown in FIG. 12, a user alias word table 342 is shown in FIG. 13 and a unique alias identifier table 344 is shown in FIG. 14. The alias table 340 is built into the object code while the tables 342 and 344 are created or modified by the user in step 320 of FIG. 6 and stored in the user alias table section 220 of the file of FIG. 4. The built-in alias word table 340 contains a list of commonly used pronouns, such as "he", "she", "it", etc. and other common terms such as "mother", "home", etc. The user table 342 of alias words typically contains first names of relatives and friends of the diarist. The unique alias identifier table 344 contains each of the alias words of tables 340 and 342 together with respective lists of specific names or terms identified by each of the alias words.

In the bottom line of the screen 290 are listed toggles 314, 315 and 316 which can be pointed to and used to quickly change the display screen if the master password is T. For example, pointing and clicking on text display toggle 314 alternates the display of compartments between all displayed and the settings of column 298. The missing text toggle cycles through all on, all off and the settings of column 304. Similarly the colors toggle 316 cycles through all on, all off and the settings of column 300.

After modification or creation of the tables of FIGS. 10, 13 and 14 in step 320 of FIG. 6, the program proceeds to step 348 where other parameters of the program are edited. For example, the user can identify a particular display card such as Hercules, VGA, etc. and can identify a particular printer to be used by the program.

Figure 15:
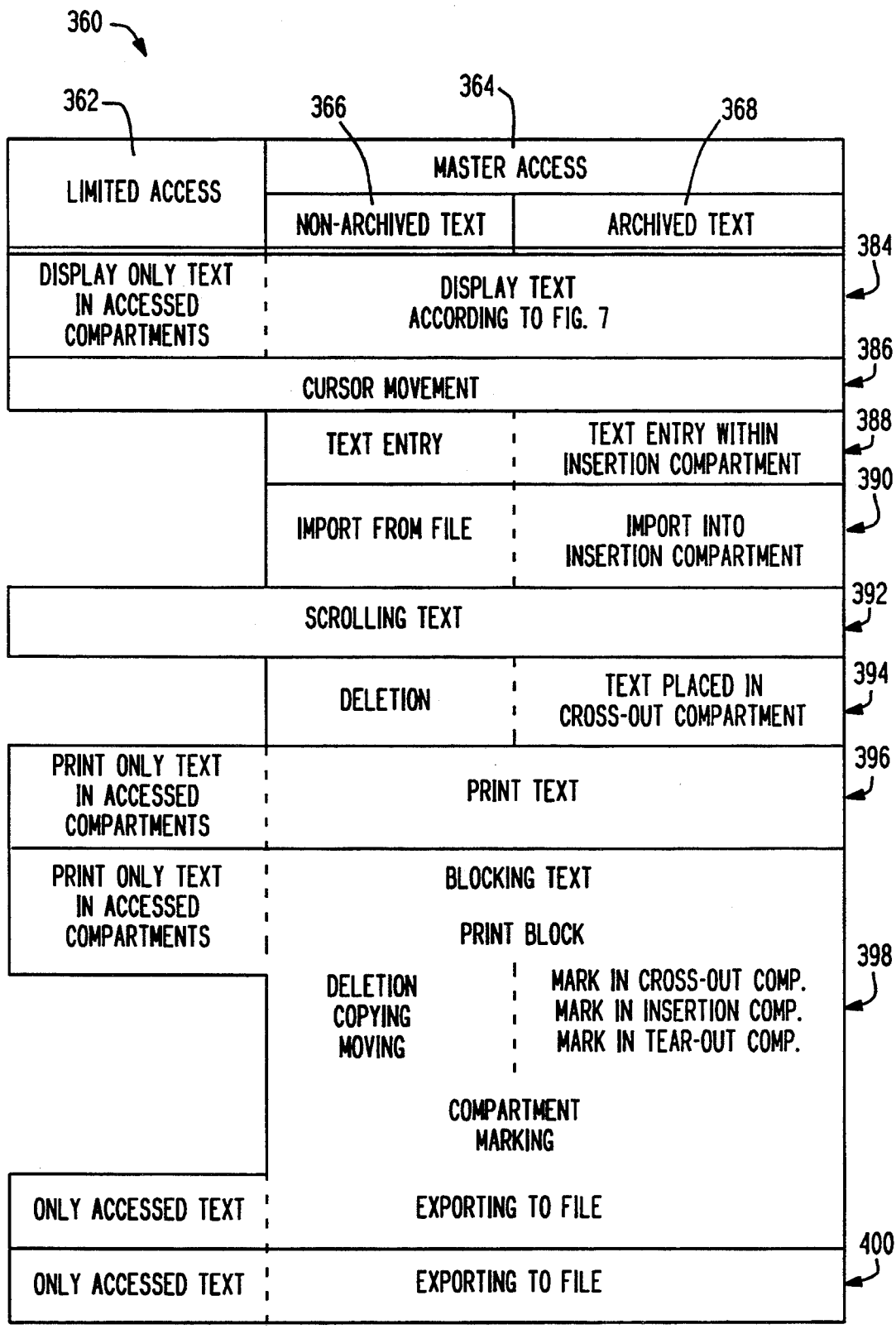
FIG. 15 is a general block diagram of some diary entry and editing functions of the computer diary of FIG. 1.
Figure 16:
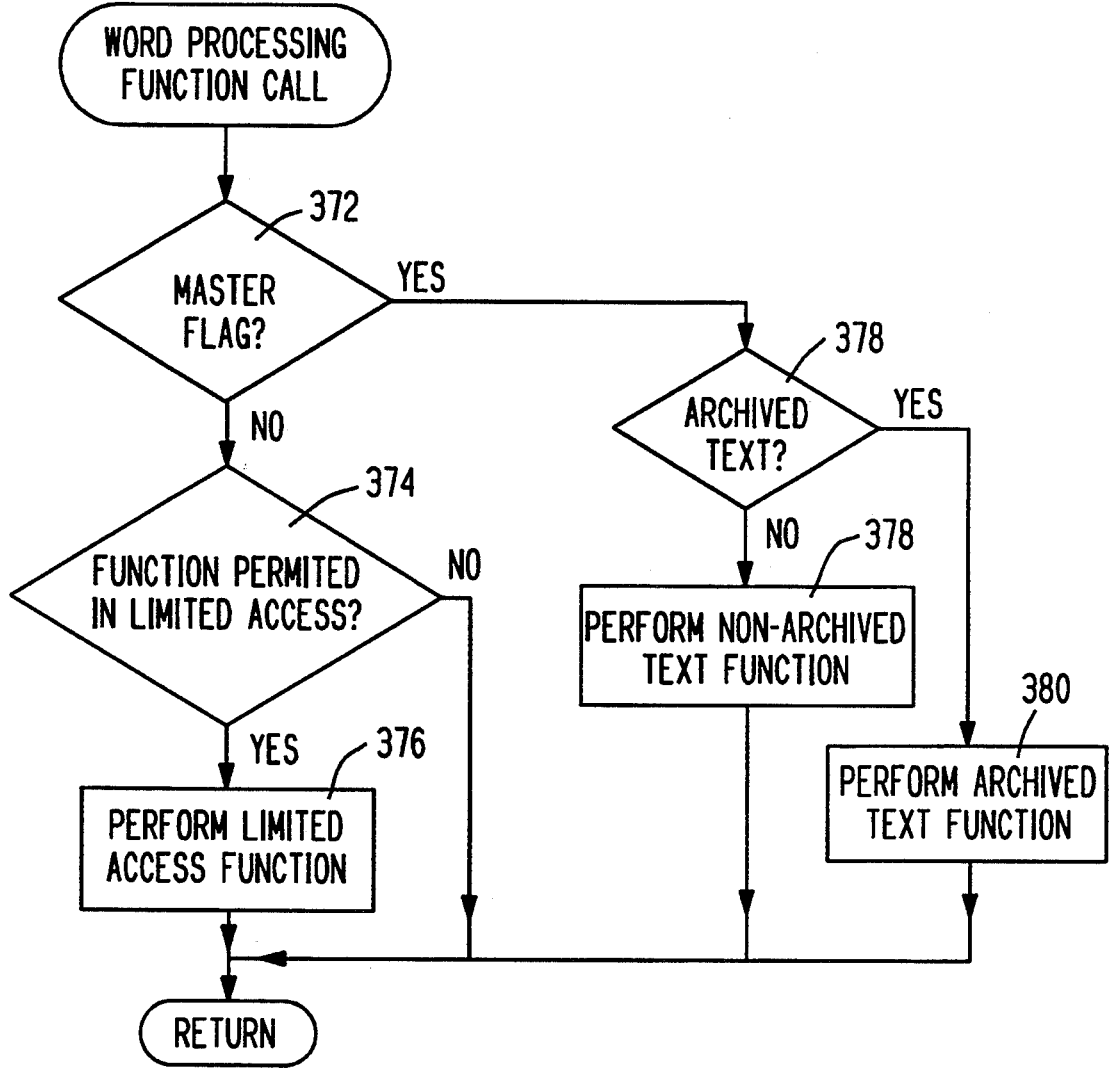
FIG. 16 is a flow diagram of computer procedures to control selection of appropriate permitted procedures in the diagram of FIG. 15.

The word processor 102 of FIG. 1 includes a number of functions as illustrated in table 360 of FIG. 15 which can be called by the pointing and clicking by means of a mouse on one of the user interface buttons shown in FIG. 8, pressing a cursor movement key, pressing a selected function key, or simultaneously pressing a ctrl or alt key with a selected function key. The functions listed in table 360 are divided into columns under limited access functions 362 and master access functions 362, and the master access functions are further divided into columns under non-archived text 366 and archived text 368. As shown in FIG. 16, the calling of a word processing function proceeds to step 372 where it is determined if the master password flag, set in step 252 or 256 of FIG. 2, is true. If false, the program in step 374 determines if the called function is one of the functions permitted under in the limited access column 362 of FIG. 15, and if so proceeds to perform that limited access function in step 376; if the called function is not permitted under limited access the program ignores the function call and returns to the user interface.

When step 372 of FIG. 16 is true, the program goes to in step 378 where it is determined whether the current text of interest has been previously archived. All text in a diary entry which has not been previously archived is non-archived text. Text previously inserted (placed in an insertion compartment) in a previously archived diary entry is also non-archived text; only the original archived text is designated as archived text. If step 378 is true, the program branches to step 380 to perform the corresponding archived function in column 368 of FIG. 15; otherwise the program branches to step 382 to perform the corresponding non-archived function in column 366 of FIG. 15.

The word processing functions illustrated in FIG. 15 include, beginning at the top row of the table, text display 384, cursor movement 386, text entry 386, file import 390, scrolling text 392, deletion 394, printing 396, blocking text functions 398, and exporting to file 400. It is noted that the listed word processing functions are only exemplary, and that many other word processing functions could be included and/or one or more of the listed functions could be excluded without affecting the useability of the diary program.

Text display under limited access is limited to those compartments for which the user has entered a correct password. Preferably, when one or more diary entries 224, FIG. 4, are read from the storage file under limited access and placed in a working memory buffer, the program deletes from the buffer all text and data that is not contained in a compartment to which access is granted. Additionally each diary entry 224 includes both reference data 226 and working data 228; the reference data is not used in any limited access function and can be deleted from the buffer or not inputted from the storage file when only limited access has been granted. When master access has been granted, working data or text 228 is displayed according to the display parameters set in the setup function of FIG. 7; the reference data 226 is never displayed except insofar as the working data includes reference data or text within displayed compartments.

The cursor movement functions 386 and the scrolling text functions 392 are generally the same for all displayed text. Cursor movement and scrolling under either limited access or master access is only performed in displayed text or data. Printing and exporting functions 396 and 400 differ between limited access and master access in that under limited access only that text in compartments for which access has been granted can be printed or exported whereas under master access text in any displayed compartment can be printed or exported. Printing and exporting of blocked text in function 398 is similarly limited to displayed text or data.

Any function which involves modification of the working data, such as text entry 388, import 390, deletion 394, and some block functions 398 like block deletion, copying, moving or text marking is not permitted under limited access.

Data modification functions differ between archived text and non-archived text. When a diary entry is archived, the corresponding reference data 226, FIG. 4, is produced and stored, and this reference data cannot be modified or changed by the diary program; editing reference data or any other data by a conventional file editing program will most likely render the file or diary entry invalid and unusable in the present diary program. However, working data 228 can be modified or changed in the computer diary program with the provision that if the corresponding diary entry has been previously archived, the modifications and changes are made in a manner that the original archived text or data can be recreated from the working data. Thus under the archived text column 368, text entries 388 and file imports 390 are placed in insertion compartments (see the text segments bracketed by ¦ I ¦ ... ¦ I ¦ in FIG. 8). Under the non-archived text column 366, text entries or imported files are not marked in insertion segments or compartments. Deletions 394 under column 368 of original archived text are made by placing the deleted text in a cross-out compartment (see text segments bracketed by ¦ X ¦ ... ¦ X ¦ in FIG. 8) while deletions to non-archived text are made in the usual manner of deleting such text from the working word processor buffer. Any insertions into insertion compartments that have been made in previously archived original text are recognized as non-archived text, and further insertions and deletions in such insertion compartment text are made under column 366 in spite of the fact that the diary entry has been previously archived.

In text blocking 398 under the archived text column 368, deletion of blocked text involves marking the text block in a cross-out compartment. Copying of blocked archived text involves placing the text in an insertion compartment at the new copy location. Moving of blocked archived text includes both marking the blocked text in a cross-out compartment at the old location and marking the blocked text in an insertion compartment in the new location. Where copying or moving involves archived text at one location and non-archived text at the other location, such copying or moving would be include operation under archived column 368 at the one location and operation under non-archived column 366 at the second location.

Blocking functions 398 under archived text column include the option of marking the blocked text in a tear-out compartment (see the tear-out marker T73 in FIG. 8). Text segments placed in a tear-out compartment are not available for display or printing unless the user remembers the tear-out password or has kept a copy of the tear-out password and in starting the diary program elects not to enter any master or manufacturer password but correctly enters the tear-out password at step 254 in FIG. 2. In this manner the tear-out compartment resembles in result a diarist tearing out a page or a portion of a page of a diary; the tear-out and its relative quantity can be made visible but the contents of the tear-out are normally not available.

Text blocking 398 is also used to mark a blocked text segment in one or more of the user defined compartments listed below the default compartment of FIG. 7. Although not illustrated in the drawings, the word processor includes such standard options as blocking and marking text for underlining, italics, etc. A block of text is highlighted with the mouse or cursor and then a button is selected resulting in underline, italics, etc. codes being placed before and after the block of text. The display or printing portion of the word-processing program detects these codes and displays the text as underlined, italics, etc. usually with the codes hidden. An option usually exists to either hide or reveal the codes for the bold face, italic, etc. options. Also standard delete options exist to delete normal printing and formatting codes as well as compartment codes other than the tear-out compartment codes as desired. System compartment codes in non-archived text can also be deleted.

Text or data entry is always into one or more (if nested) of the default and user defined compartments. For example in FIG. 8, the upper seven lines of displayed text are in a default compartment bracketed by ¦ 0 ¦ ... ¦ 0 ¦. The patent data in line 8 is not in the default compartment but is within its own compartment ¦ 1 ¦ ... ¦ 1 ¦. Line 8 is in a default compartment. The compartment in which data or text is to be entered is selected by pointing and clicking on the compartment button at the top of the screen in FIG. 8 or by pressing an appropriately assigned function key or simultaneous combination of shift, CTRL or ALT and function key. Any text not otherwise placed in a user defined compartment is placed by the program in the default compartment.

Figure 17:
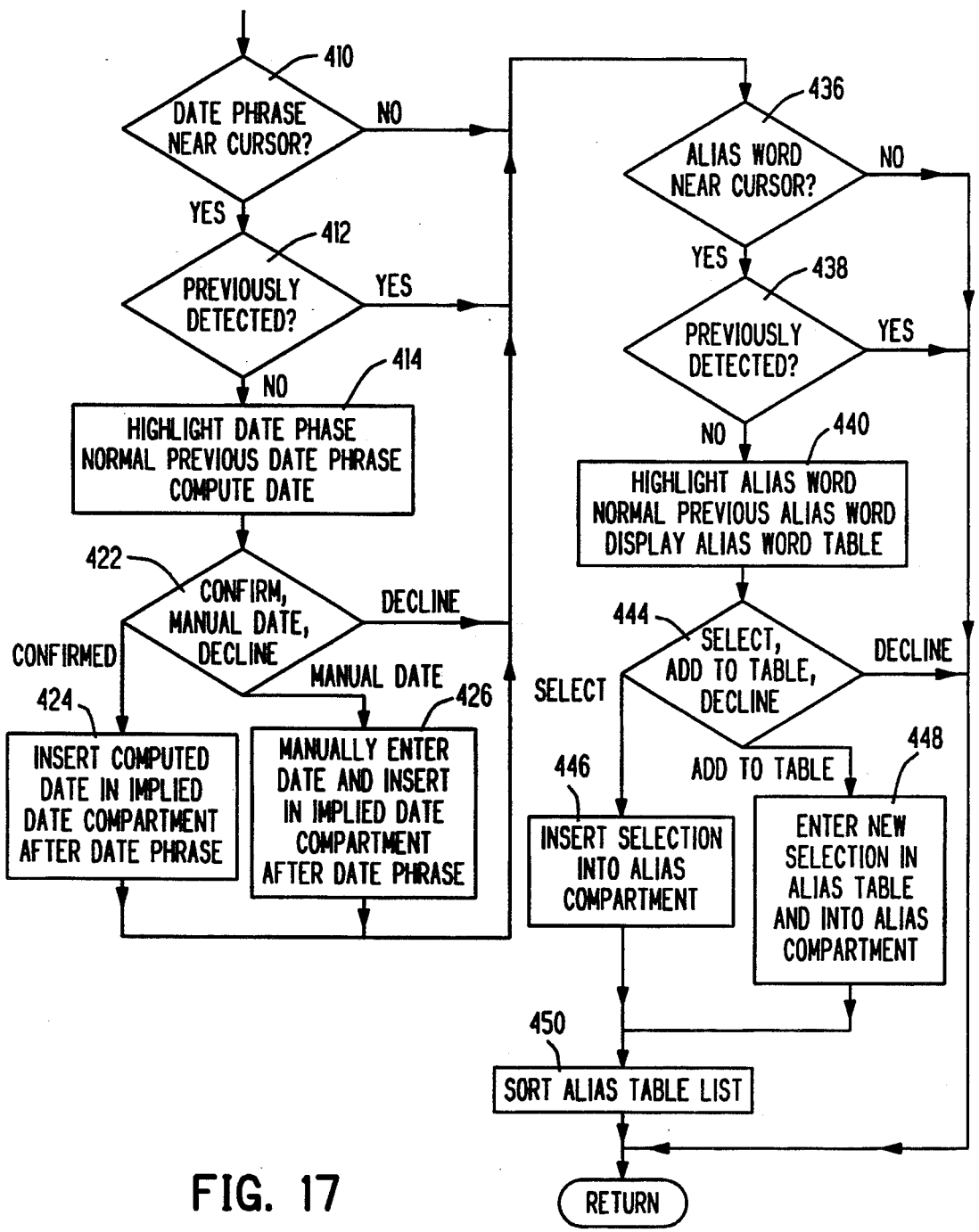
FIG. 17 is a flow diagram of relative date phrase monitoring and generic phrase monitoring procedures in the computer diary of FIG. 1.

During text entry or cursor movement, the word processor in functions 144 and 146 of FIG. 1 monitors words at and near the cursor and suggests absolute dates for relative date phrases and correct unique identifiers for aliases. A procedure called by text entry or cursor movement for performing these functions is illustrated in FIG. 17. In step 410 the program determines if a date phrase (phrase matching any of the date phrases listed in the first columns of the tables of FIGS. 9 and 10) is near the cursor. If true, then in step 412 it is determined if this date phrase has been previously detected such as by being highlighted. If not, then in step 414 the newly detected date phrase is highlighted (see highlighted text 430 in FIG. 8) and any previously highlighted date phrase is returned to normal. Also in step 414, the absolute date for the date phrase is computed using the formula pointed to by the corresponding formula index number of FIG. 9 or 10 if there is no implied date compartment ¦ ID ¦ ... ¦ ID ¦ immediately following the phrase. The calculated absolute date or an already existing implied absolute date is displayed at 418 in the user interface of FIG. 8, and the user is given the opportunity in step 422 of confirming, step 424, or declining the suggested or existing implied date or of entering manually another absolute implied date, step 426; as a program setup option the absolute date may or may not be confirmed by default if the user continues to enter text or move the cursor. In either of steps 424 or 426, the corresponding implied absolute date is placed in an implied date compartment immediately after the date phrase. An implied date indicator ¦ID¦ is not displayed after the relative date phrase unless the corresponding missing text indicator in column 304 of FIG. 7 is ON and the implied date itself is not displayed unless the corresponding text display indicator in column 298 is ON.

From steps 424 and 426, from step 422 when decline is chosen, from step 412 if true or from step 410 if false, the program proceeds to step 436 where the words near the cursor are compared to the alias words in the tables of FIGS. 12 and 13. If there is a match then in step 438 it is determined if the alias word has been previously detected such as by being already highlighted. When step 438 is false, the program in step 440 highlights the newly detected alias word, removes the highlighting from the previous alias word if displayed, and displays the corresponding list of specific alias identifier words from the table of FIG. 14 at 442 in FIG. 8 if the alias word does not have any alias compartment marker ¦A¦ immediately following the alias word; if the alias word is followed by ¦A¦ the contents of the alias compartment are displayed at 442. The diarist in step 444 is given the opportunity to select one of the displayed specific identifier terms by simultaneously pressing ALT and the number of the identifier term (the identifier terms can be scrolled if they can not all be displayed in the space 442) causing the program in step 446 to insert the selection into an alias compartment immediately following the alias word. When an alias compartment already exists at step 444, the diarist can simultaneously press ALT and "I" to erase the existing the existing identifier term and call the corresponding list for display at 442 and selection. Simultaneously pressing ALT and "A" at step 444 causes the program to branch to step 448 where the diarist can enter a new specific identifier term into the corresponding list in the alias table and into an alias compartment immediately following the alias word. Pressing ALT and "D" simultaneously results in no alias identifier term being selected. If the diarist continues to type or move the cursor, the program in accordance with a setup default option either inserts no alias compartment or selects the first displayed specific identifier term in step 446, or makes no change if the alias compartment already exists. When a new term is added in step 448, or a selection other than the first selection is selected in step 446, the program in step 450 sorts the corresponding list in the alias table by placing the current selection as the first item in the list, and the next closest preceding different alias identifier term (found in the corresponding list) as the second term in the list. The third location in the sorted list, if different from the first two, is the unique identifier most frequently found in the preceding two pages of diary entries. The order of any remaining terms following the second term remains unchanged.

Figure 18:
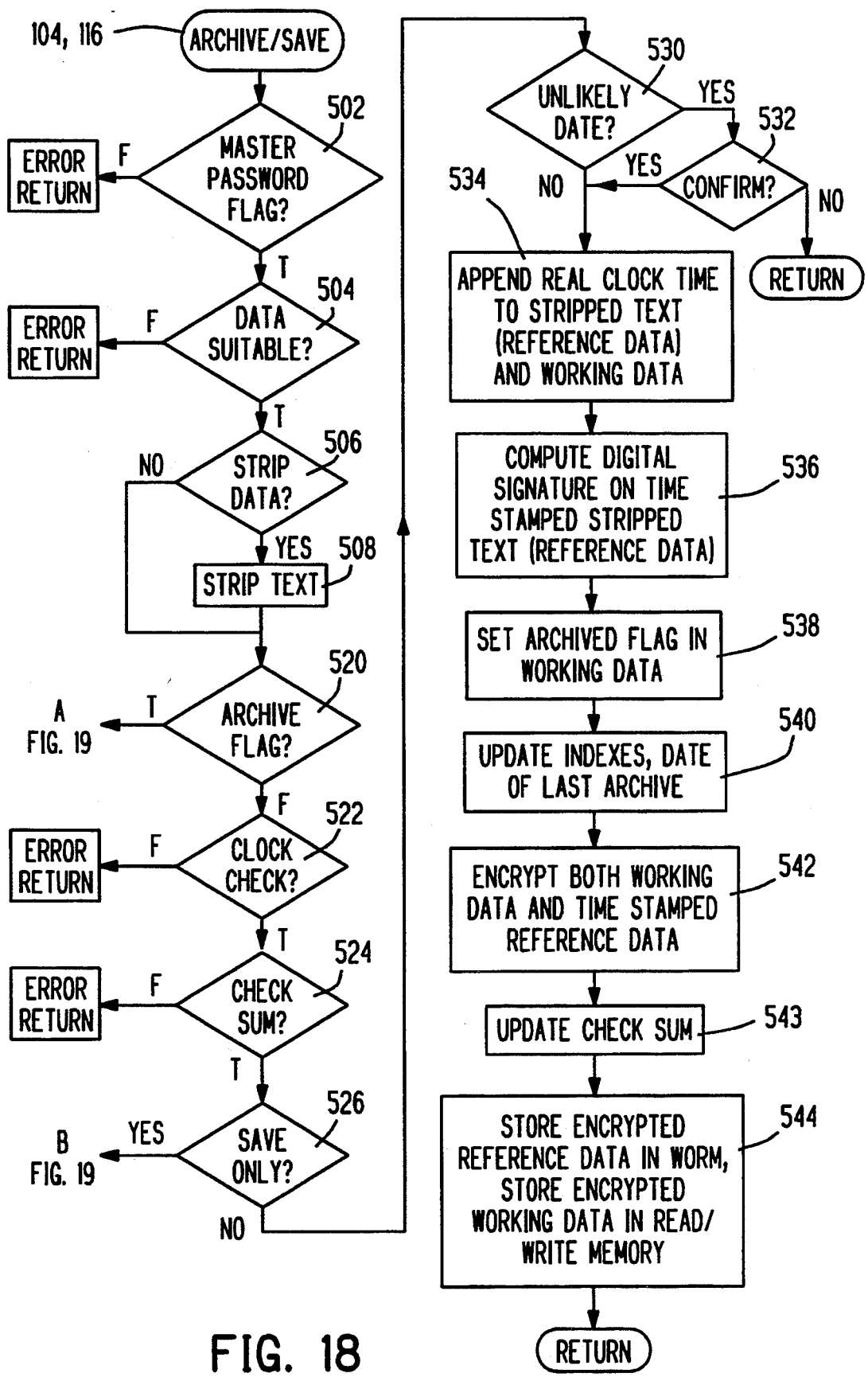
FIG. 18 is a flow diagram of a first portion of an archive/save procedure of the computer diary of FIG. 1.
Figure 19:
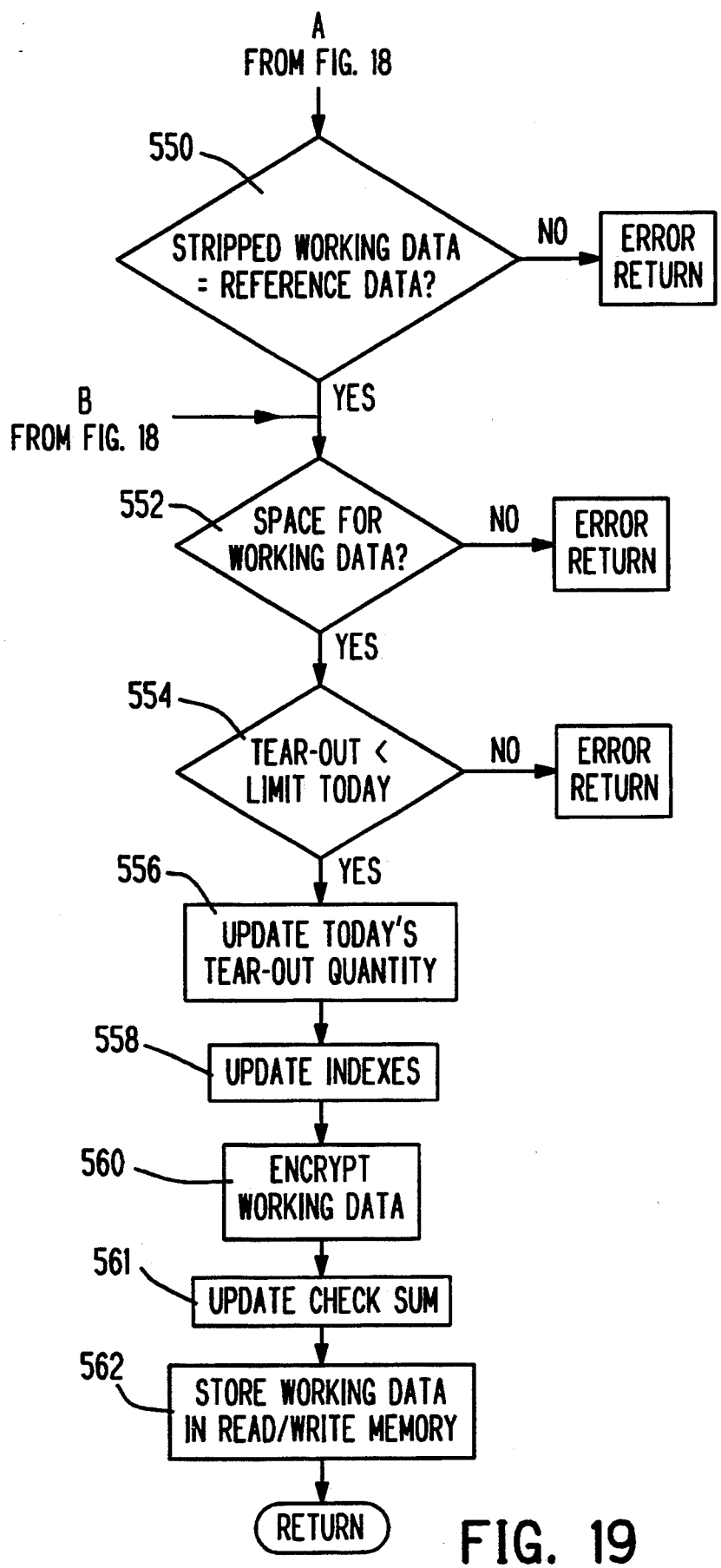
FIG. 19 is a flow diagram of a second portion of the archive/save procedure of the computer diary of FIG. 1.

The archive/save functions 104 and 116, FIG. 1, are illustrated in the procedure of FIGS. 18 and 19. The save function 116 allows the diarist to temporarily save a new diary entry that is incomplete without archiving. When a non-archived diary entry is saved (as contrasted with archived) the diary program stores a corresponding working data section 228 without forming and storing any reference data section 226, and the corresponding archive flag in the working data will be false. When the diary entry has previously been archived, the save and archive functions are the same. In step 502 it is determined if the master password flag is true; no save or archiving is permitted for a user with limited access. The existence of suitable data is determined in step 504; the saving or archiving of an empty diary entry or one without any words or displayable data is generally prohibited.

Figure 20:
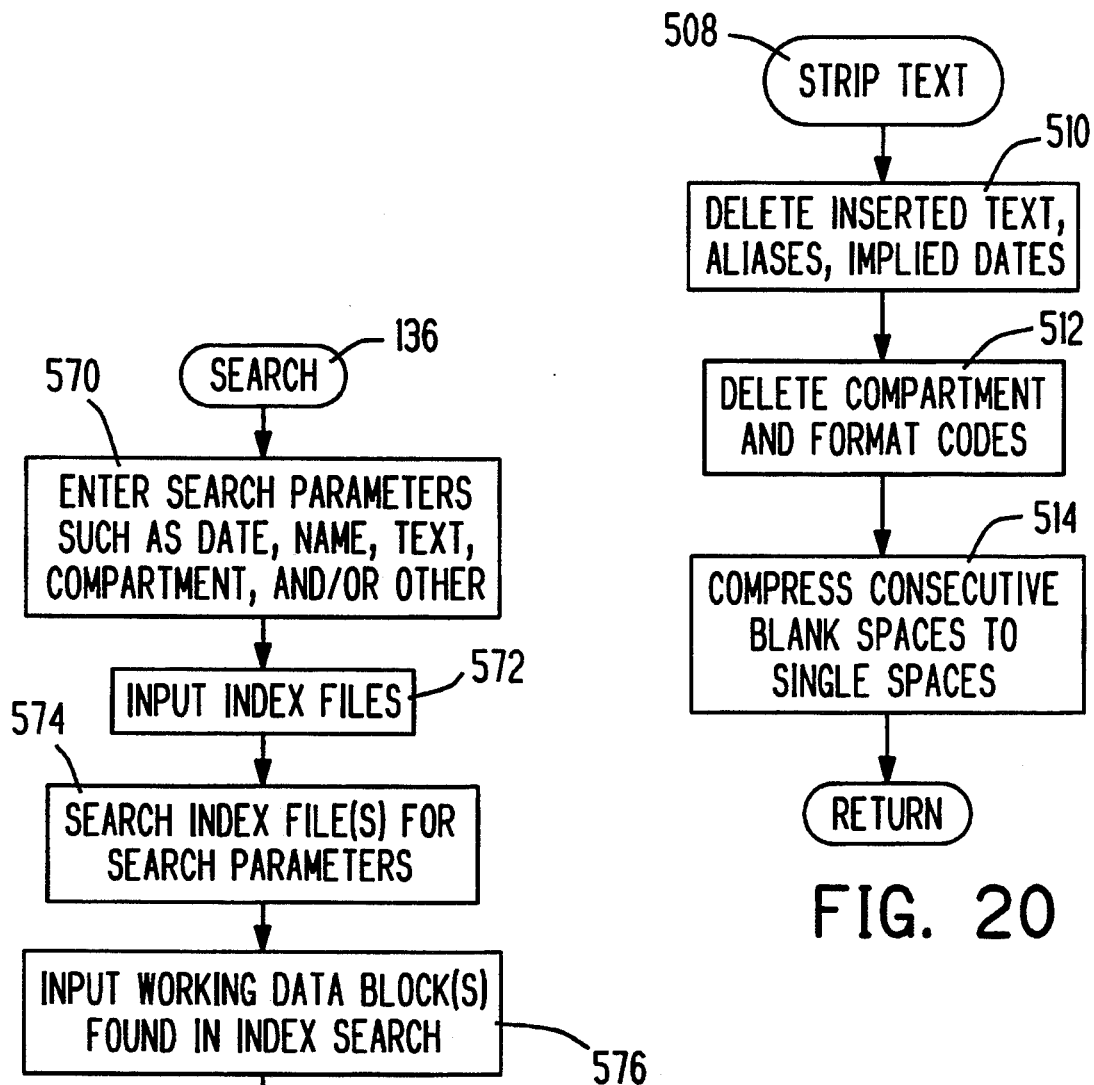
FIG. 20 is a flow diagram of a text stripping procedure used in the archive and restore procedure of FIG. 18.

Next in step 506 the program determines if the data is to be stripped. Generally all diary entries are to be stripped; however if a diary entry consists entirely of graphical data then stripping could distort the data to the extent that no useable data remains after stripping. The stripping procedure 508 is illustrated in FIG. 20 and includes step 510 where any text within insertion, insertion date, alias, and implied date compartments is deleted, step 512 where compartment and formatting codes are deleted, and step 514 where consecutive blank spaces are compressed to single blank spaces. This results in a canonical form of the text. A person skilled in the arts of compression and encryption will appreciate that many other canonical forms are possible.

Referring back to FIG. 18 in step 520, it is determined if there is an archive flag for the present diary entry, i.e. if the present diary entry has been previously archived. A diary entry can only be archived once, i.e. stored reference data 226 is WORM data and cannot be changed; changes can only be made to the working data 228. When the diary entry has not been previously archived, the program proceeds to steps 522 and 524 where the clock and check sum flags, respectively, are sensed to insure that the clock is appears to have the correct date and that the file has not previously been corrupted. In step 526 the program determines if the diarist wishes to only save the diary entry without archiving, i.e. did the user select save 116, FIG. 1. If false, the program then in step 530 determines if the present clock date is unlikely, for example more than one week past the last archive date. When true, the diarist must confirm in step 532 that the date is correct to ensure that the computer clock is not been set or is not malfunctioning to give a date in the distant future which would prevent storage of later diary entries with dates prior to that future date.

In archiving the diary entry, the program at step 534 appends the real clock time to the stripped text and working data. Then in step 536 a digital signature is computed on the time stamped stripped text; the digital signature is a one-way encryption of the text and time data into a fixed length code that is most highly unlikely to be reproduced if changes were made in the text or data. This digital signature is appended to the time stamped stripped text to form the reference data 226 of the corresponding diary entry. Next in step 538 the archive flag in the working data is set true following which the indexes 230 and 232 and the date 204 of the most recent archive are updated in step 540. The reference data 226 and working data 228 are then encrypted in step 542, the checksum 196 is updated in step 543, and the encrypted reference data working data are stored in step 544.

If in step 520 of FIG. 18, it is found that the diary entry has previously been archived, i.e. the archive flag is true, then the program branches to step 550 of FIG. 19 where the stripped working data is compared to the stored reference data. Alternatively where the reference data is only a digital signature, the step 550, FIG. 19, computes the digital signature on the stripped working data with appended time stamp (see step 536 of FIG. 18) and compares the resulting digital signature with the stored reference data. Step 550 detects modification of the original diary entry portion of the text by any program other than the present diary program and when such a discrepancy is uncovered produces an error message and prevents storing the modified working data.

If there is a match in step 550, then the program proceeds to step 552 where it is determined if there is sufficient disk storage space to save the file with the modified or new working data. Step 552 is also the entry point for a branch from step 526 when the diarist has selected to save an new diary entry without archiving. In the next step 554 the program determines if the quantity of tear-out words for today exceed a maximum limit. The diarist is inhibited from making large scale tear-outs of major portions of the stored diary entries by permitting the diarist to tear-out (place in the tear-out compartment) only a relatively small portion of any large quantity of diary text; the diarist over a period of several or many days may tear-out most or all of the text.

If the tear-out limit is not violated, then the program in step 556 updates the file tear-out quantity 206, in step 558 updates the indexes 230 and 232, in step 560 encrypts the working data, in step 561 updates the checksum 202, and in step 562 stores the working data in read/write memory such as a magnetic disk.

Figure 21:
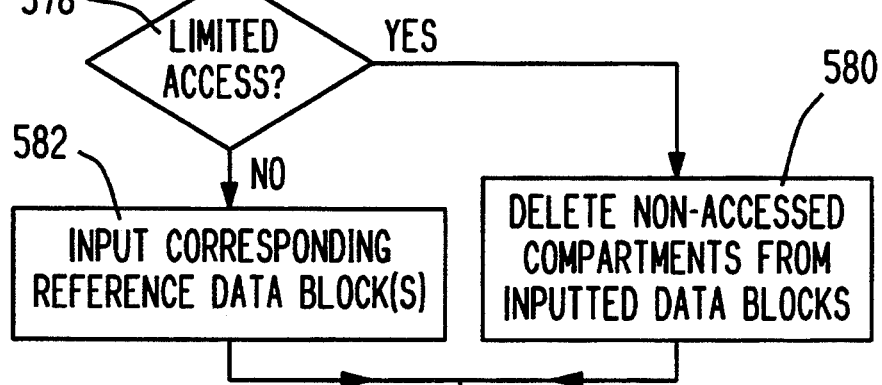
FIG. 21 is a flow diagram of a search procedure used in the computer diary of FIG. 1.

The search and retrieve procedure 136 is shown in FIG. 21 and includes step 570 where the user enters one or more search parameters such as date, date range, name, key text words, compartment name, and the like. Next in steps 572 and 574, the program inputs the indexes 230 and 232 and looks for the search parameter or parameters. When a match is found the corresponding working data block or blocks are input in step 576. In step 578, the program determines if there is only limited access, and if so, then deletes the non-accessed compartments from the inputted data blocks in step 580; otherwise, the corresponding reference data block or blocks are input in step 582.

The authenticate procedure is shown in detail in FIG. 22 wherein the first step is to input the time-stamped data (working data if reference data consists only of a signature) and the signature (reference data). If the input data is working data text, then the program branches at 604 to the strip data procedure 508, FIG. 20. At step 608 the program branches to conventional public key procedure 610 if the public key procedure is used in authentication. Otherwise, the program proceeds to step 612 where the signature is computed from the stripped text and appended time stamp. This computed signature is compared to the signature in the archived reference data and if found identical at step 614 returns a confirmation signal in step 616; otherwise a non-confirmation signal is returned in step 618.

As illustrated in FIG. 23, the exit procedure 152, FIG. 1, begins with detecting the checksum flag in step 630 and the master password flag in step 632. If either are false (F) then the program returns to the operating system. If both the checksum and master flags are true, then the program at step 634 gives the user the opportunity to call the archive function 104 so that any new diary entry that may have been produced can be archived. When the user declines to archive a diary entry at step 634, the opportunity to call the save function 116 is presented in step 636. In any event the program returns to the operating system at the end of the exit procedure.

Figure 24:
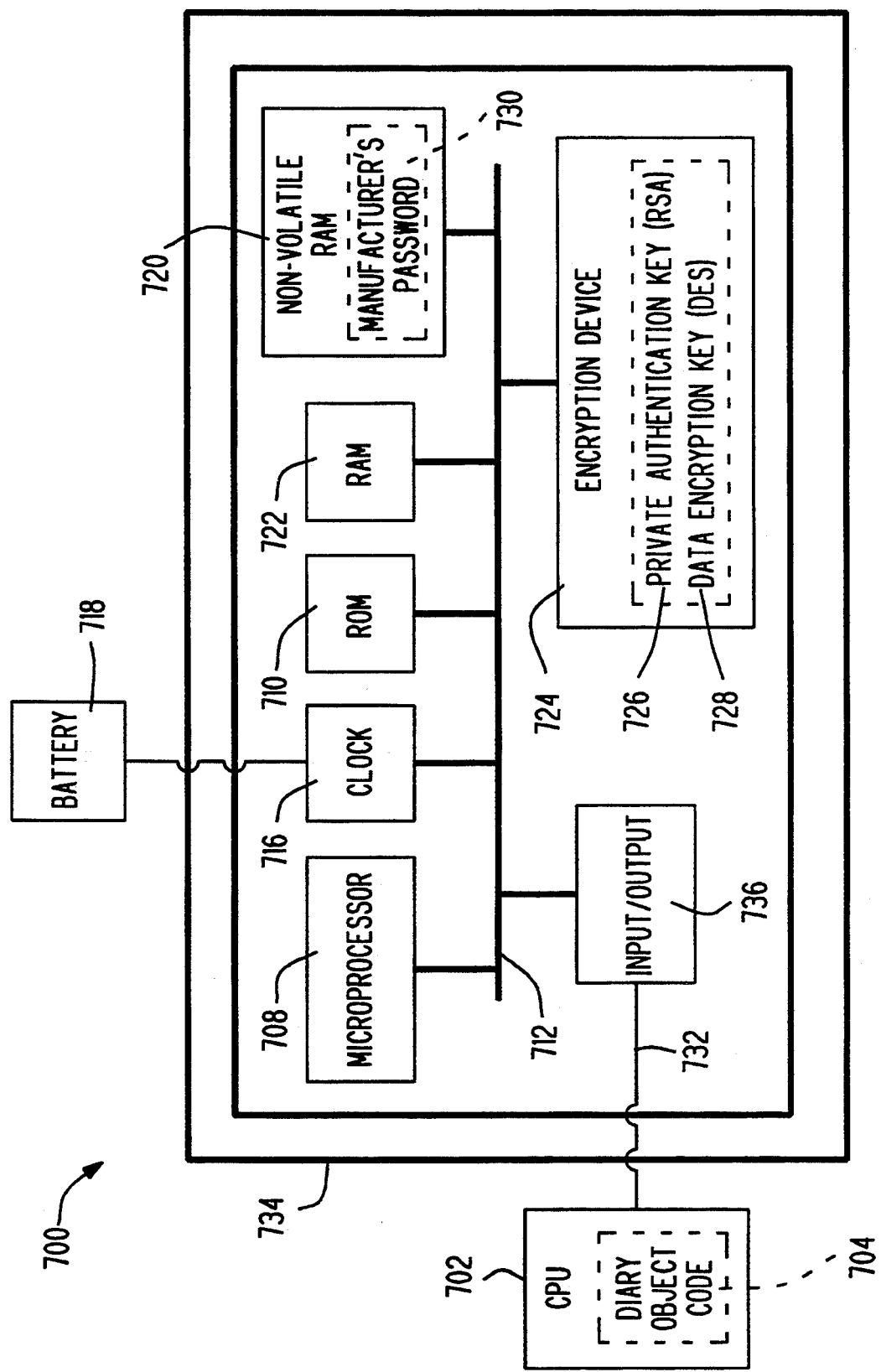
FIG. 24 is a block diagram of a computer system with hardware elements which can, alternatively, be used to perform some of the functions of the software embodiment of FIGS. 1–23 with greatly enhanced security.

In another embodiment of the digital diary, special hardware shown in FIG. 24 is used. An authentication-/encryption device 700 is connected to the CPU 702 operating diary object code 704, and may be used to improve the security of the time-stamping, authentication, and authentication verification as well as for the encryption and decryption of stored data. The device 700 comprises a microprocessor 708 to control the overall system under the control of a program stored in the Read Only Memory (ROM) 710. Communication between the elements of the device is carried on via a bus 712. Also included in the device is a digital clock 716, powered by a trickle-charged battery 718 which can be accessed from outside the device in order to ensure un-interrupted power to the clock 716. The clock 716 is set at the factory and is secured against being reset by anyone, including the owner of the device. The microprocessor 708 periodically runs diagnostic checks on the clock 716, and shuts down all operations of the device should the diagnostics fail. One of these diagnostics is to periodically store the time in a non-volatile portion 720 of a random access memory (RAM), and to check that the current time is later than the stored time. The device also contains volatile RAM 722 used by the microprocessor 708 and an encryption device 724 to hold data during execution of processes directed by them.

The encryption device 724 is capable of computing digital signatures and of encrypting and decrypting data. It contains within it in a secure and tamperproof manner the RSA authentication private key 726 and/or the DES encryption key 728 which have been discussed previously. The manufacturer's password 730, which has also been discussed previously, is stored in the embodiment of FIG. 24 in the non-volatile RAM 720 and thus is not encrypted and stored in the object code of the diary program as in the previous embodiment in FIG. 3 at 168. Thus the diary program object code 704 does not contain any portion of object code to decrypt and replace those data in the object code (see 166 in FIG. 3).

The option of invalidating the manufacturer's password in this embodiment is allowed to be a valid command to the encryption/decryption device 700 so long as the master password has been input to the device. The same procedure may be followed as in the software embodiment except that in this case the replacement of the original manufacturer's password takes place in the encryption device; the manufacturer's password and its replacement are placed in non-volatile RAM 720 in the encryption device.

The device 700 accepts data from the CPU 702 via a communications port 732 which passes through a physical seal 734 to an I/O port 736 connected to the bus 712. The physical seal prevents access to the circuits and data in the device 700 except through the port 732. The microprocessor 708 and the I/O port 736 prevent seizure of control of the data and the device through the port 732 on bootup. Once the device is booted the microprocessor treats all input as data and reissues only valid commands related to data authentication. A major function of the physical and electrical security is to ensure that the keys and manufacturer's password can be kept secret.

In a diary embodiment employing the authentication/encryption device 700, the device 700 is used to time-stamp and authenticate data in place of using software algorithms as was accomplished in the previously described software only embodiment at step 536 in FIG. 18 or step 612 in FIG. 22. The data is passed to the device 700 through the communications port 732 from the CPU 704. The data is stored in the RAM 722. The encryption device 724 is first used to compute the hash of the data. (This hash could alternatively be computed in the CPU and it alone be transmitted to the device 700 instead of transmitting the complete file and having the hash computed there.) Then the current time from the clock 716 is appended to the hash, and the encryption device is used to compute a digital signature of the hash and appended time using the authentication private key 726. The hash, time, and digital signature are returned to the CPU 702. At this point the diary object code flow resumes in FIGS. 18 or 22 as if steps 536 and 612 had proceeded strictly in the diary software object code.

A second use of the authentication/encryption device 700 is to encrypt and decrypt all data as it is stored and recovered from the archive file of FIG. 4. In function 112 of FIG. 1, the CPU 702 passes the encrypted file, or a portion thereof, to the device 700 with the appropriate decryption instruction to decrypt the data, and the decrypted data is returned to the CPU 702 by the device 700. In function 110 of FIG. 1, the data to be stored is passed to the device 700 by the CPU 702 with the appropriate encryption instruction and the encrypted data is returned to the CPU 702 by the device 700. Instead of encryption and decryption being performed using the diary object code as in the previous embodiment, it is performed in the authentication/encryption device 700.

When data is received by the device 700 to be encrypted it is passed first by the I/O port 736 to RAM 722 where it is encrypted by the encryption device 724 using the secret DES encryption key 728 and then the encrypted data is passed back to the CPU 702 by the input/output 736. Decryption is performed in a similar manner.

The third and final function of the authentication/encryption device 700 is to perform authentication on data submitted to it. In this case the public key authentication step 610 of FIG. 22 which has been discussed above is performed within the device 700 instead of within the diary software. The authentication is performed using the public key of the private key-public key pair. The signature, decrypted using the public key, is returned to the CPU 702 where it may be compared to the stored time-stamped hash. The public key is stored within the encryption device 724 for convenience even though it is not secret and could be input with the data itself.

At this point we remark that there are methods of authentication which have only a single secret key, so called secret key methods. In this case the time-stamped text with the digital signature for which verification of the authentication is desired is input to the secret-key encryption/authentication device 700 and a new digital signature is computed on the time stamped text without the current date being appended. Then the new digital signature is compared internally to the original digital signature and if they are the same a confirmation signal is emitted to the CPU. In this approach the newly computed signature cannot be returned to the CPU to check authentication by comparison with the existing signature since, if this were done the user of the device could falsify an authentication by submitting data with a realistic but falsified time-stamp and thus obtain the digital signature appropriate to any date without knowing the secret key. So in this case the device 700 follows the secret or non-public key path procedure outlined in FIG. 22. The device 700 internally computes the digital signature (612 of FIG. 22) of the time-stamped hash and then internally compares (step 614 of FIG. 22) to the input signature. If they are identical the device 700 returns a confirmation signal to the CPU 702. If they are not identical a non-confirmation signal is returned but not the calculated signature itself. This same procedure would be followed if a secret key authentication method were used in the software only embodiment.

In a variation of the secret or non-public authentication approach a second nearly identical encryption/authentication device (not shown) with the same secret key but without the capability to output a signature could perform the same verification of authentication without the verifier being able to falsify the document after he has received it. Note that the second device need not have a real-time clock 716, nor its battery 718, nor need it have an encryption capability except as required to compute the digital signature. We may term these second devices secret verification devices. Obviously these devices will be substantially cheaper and more robust than the complete encryption/authentication devices. Distribution of as many copies as desired of these secret verification boxes to all those who need to verify authentication of messages authenticated by the first secret encryption/authentication device would provide many of the benefits of a public key authentication system. Of course the security of such a system rests on the ability of the physical seal 735 and the electronic seals or safeguards to protect the private key 726 which, in the case of the use of a secret key would likely not be an RSA key. Such a second private verification device could also be routinely given to a third party to be used in case there were questions about the authenticity of some diary reference data which had been output. So long as the seals could be seen to be untampered with it would not be necessary to trust the third party.

The use of the hardware authentication/encryption device 700, FIG. 24, ensures that the time of a diary entry cannot be falsified either by resetting the system clock in the CPU 702, nor by using advanced computer engineering methods to determine the secret keys and password 168, FIG. 3, in the object code and using them to access and/or change the passwords and data in the archive files.

There still remains the possibility that the complete archive files can be erased by use of another program. Someone with access to the encryption key, or to the encryption device 700, but not the passwords could read the data even if they could not falsify it. These possibilities can be prevented by means of the secure archival data storage device 750 in FIG. 25. This device 750 is in many ways identical to the device 700 in FIG. 24. The time-stamping and authentication capabilities discussed in connection with FIG. 24 are also available and implemented in a similar way in the secure archival data storage device.

However, the device 750 differs in that it includes an archival storage medium, such as a high capacity disk drive and controller 752, connected through a second I/O port 754 to an I/O device 756. In the device 750 the seal 734 encloses also the disk-drive and controller 752 to prevent physical access to the archival files of FIG. 4. As in the authentication/encryption device 700 of FIG. 25, the microprocessor 708 also examines all commands from the CPU 702 as data to ensure that they conform to a list of valid commands stored in ROM 710. A record is kept in non-volatile RAM 720 of locations on the hard disk where the reference data 226, FIG. 4, previously written are located. A command to write to these locations is not permitted. (Of course, should the disk be a WORM optical disk instead of a magnetic disk, as in this embodiment, it would be unnecessary to include this restriction.)

Figure 25:
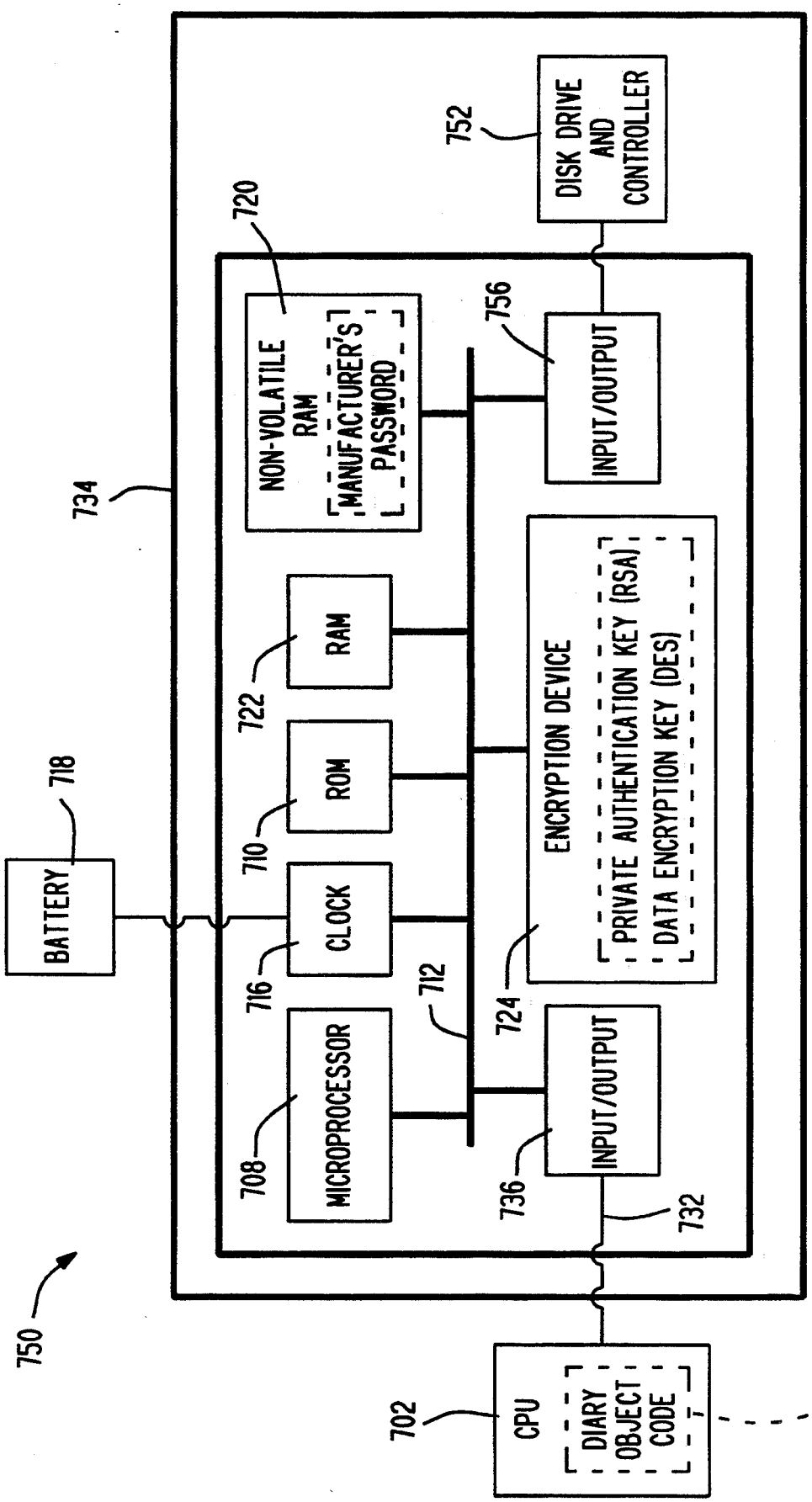
FIG. 25 is a block diagram of a second computer system with hardware elements which can, alternatively, be used to perform some of the functions of the software embodiment of FIGS. 1–23 with still greater enhanced security.

To further enhance the security of the embodiment using the secure archival memory system in FIG. 25, the software code which examines retrieved text to ensure that only data with the proper passwords are available to user (discussed above in connection with retrieval step 580 in FIG. 21) is replaced with similar code in the ROM 710 and used to delete data returned from the disk which is in compartments for which passwords have not been received from the CPU 702. This ensures that such data never leaves the protected and secure archival memory device consisting of the disk drive and controller 752 together with the authentication/encryption device 750 within the physical seal 734, unless the appropriate passwords have been input. The code discussed in reference to step 580 in FIG. 21 is thus transferred from the diary object code of FIG. 3 to the ROM 710 in the embodiment in which the secure archival memory device is used.

Also, since the device 750 protects the data from those who do not have knowledge of the passwords, and also protects the reference data from alteration even by the diarist, it is no longer necessary to encrypt the data or the index before it is archived; and correspondingly no longer necessary to decrypt it upon retrieval. So these functions of the software and hardware which have previously been discussed can be removed from the diary software and hardware.

The above described software and/or hardware forming a personal computer diary is designed to be incorporated in any conventional computer including conventional personal desktop, laptop and notebook computers. Additionally the disclosed personal computer diary can be incorporated in a special purpose personal computer similar to a conventional notebook computer, but limited to use as a personal diary with seals enclosing the clock, disk or other permanent storage, encryption circuitry, and input/output circuitry. The special purpose diary computer can be provided with built-in public/private key time stamping and/or encryption facilities.

Since many modifications, variations and changes in detail can be made to the above described embodiments without departing from the scope and spirit of the invention, it is intended that the above description and the accompanying drawings be interpreted as only illustrative and not in a limiting sense.

What is claimed is:

1. A computer system for archiving data blocks, comprising
    data processing means for forming and editing original data blocks;
    means for generating and storing a first representation of each formed and edited original data block combined with an original date as a reference data block;
    means for preventing modification of a reference data block;
    means for storing a second version of each original data block and corresponding original date in association with the respective reference data block as a working data block;
    means for modifying one of said stored working data blocks to produce a modified working data block wherein the modifications to said one working data block are made by marking the one working data block so that the modifications can be identified and removed or restored to recreate the corresponding original data block; and
    authentication means for removing the marked modifications from the modified working data block to recreate the corresponding original data block and original date and for generating a representation of such recreated original data block which is identical to the corresponding stored reference data block in the absence of corruption of said data blocks.

2. A computer system for archiving data blocks as claimed in claim 1 wherein the means for generating and storing reference data blocks includes encryption means.

3. A computer system for archiving data blocks as claimed in claim 1 including authentication means for comparing the representation of the recreated original data block and original date with the corresponding stored reference data block.

4. A computer system for archiving data blocks as claimed in claim 1 wherein said means for generating and storing reference data blocks includes
    a real time clock,
    means for appending the current date from said real-time clock as said original date to each original data block; and
    means for forming an encrypted digital signature of each original data block and appended date.

5. A computer system for archiving data blocks as claimed in claim 4 wherein each reference data block comprises the corresponding digital signature.

6. A computer diary comprising
    a real-time clock including means for generating a current date;
    processing means for forming and editing original diary entries;
    archiving means for storing each original diary entry as both a reference data block and a working data block and for storing the current date as an original diary date associated with the respective reference data block;
    means for modifying a selected one of said stored working data blocks to produce a modified diary entry by marking the modifications to the selected working data block so that the modifications can be identified and removed to restore the corresponding original diary entry; and
    means for retrieving the modified working data block and removing the marked modifications from said modified working data block to form an authentication data block for being authenticated as identical to the corresponding stored reference data block.

7. A computer diary as claimed in claim 6 wherein the means for marking modifications include means for bracketing a portion of an original diary entry with tear out codes to identify such portion as a tear out portion, and means for preventing display of the tear out portion except upon entry of a tear out password.

8. A computer diary as claimed in claim 7 including means for keeping track of the amount of text marked with tear-out codes during a predetermined period of time, and means for limiting the total amount of text marked with tear-out codes during the predetermined period of time.

9. A computer diary as claimed in claim 6 wherein the means for marking modifications include means for bracketing a portion of an original diary entry with mark out codes to identify such portion as a marked out portion, means for bracketing inserted material in the original diary entry with insert codes to identify such inserted material, and means for displaying marked out portions and inserted material with respective distinguishing characteristics so that such displayed marked out portions and inserted material can be readily distinguished from any remaining portion of the original diary entry.

10. A computer system for entering and editing textual data entries comprising
processing means for forming and editing text entries as input by a user;
means for storing and retrieving each text entry;
a list of aliases together with one or more specific identifiers for each alias;
means for monitoring the input of text entries to detect entry of an alias in said list;
means for displaying the one or more specific identifiers corresponding to the detected alias to assist the user to select a correct identifier of the detected alias; and
means for placing the selected identifier in the respective text entry adjacent the detected alias.

11. A computer system as claimed in claim 10 wherein the list of aliases includes pronouns.

12. A computer system as claimed in claim 10 wherein the placing means brackets the placed identifier with alias codes in the respective text entry.

13. A computer system as claimed in claim 10 wherein the specific identifier displaying means includes means to add an additional specific identifier to the displayed list.

14. A computer system as claimed in claim 10 including means for sorting the displayed list of specific identifiers to place the selected specific identifier at the top of the list and to place the closest previous different specific identifier corresponding to the detected alias second on the list.

15. A computer system for entering and editing textual data entries comprising
processing means for forming and editing text entries including relative date phrases as input by a user;
means for storing and retrieving each text entry;
a plurality of formulas for calculating absolute dates from relative date phrases;
a list of relative date phrases together with corresponding index pointers to the respective formulas for computing absolute dates from the relative date phrases;
means for monitoring the input of text entries to detect entry of a relative date phrase in said list;
means responsive to the detection of a relative date phrase for computing an absolute date using the corresponding formula and for displaying the computed absolute date corresponding to the detected relative date phrase to assist the user to select a correct absolute date of the detected relative date phrase; and
means for placing the selected absolute date in the respective text entry.

16. A computer system as claimed in claim 15 wherein the means for placing the computed absolute dates in the text entry includes means for bracketing the absolute dates with implied date codes.

17. A computer system as claimed in claim 16 wherein the processing means includes display means for displaying text entries, and user controlled means for selectively displaying or hiding absolute dates bracketed by implied date codes.

18. A computer system for storing and retrieving digital data comprising
storage means for storing a data file;
first password means for enabling master access to the computer system upon correct entry of a master password by a user;
data processing means enabled by the first password means for forming, storing, retrieving and editing data blocks in the data file;
said data processing means including means for bracketing user selected portions of the stored data blocks with predetermined compartment codes to define said bracketed data portions as belonging to one or more user defined compartments; and
second password means responsive to entry of one or more compartment passwords for enabling retrieval of selected portions of the stored data blocks in said one or more user defined compartments and for preventing retrieval of all other portions of stored data in the data file.

19. A computer system as claimed in claim 18 wherein the data processing means includes user selected display means for selecting display or non-display of portions of data blocks within the user defined compartment when enabled by the master password.

20. A computer system as claimed in claim 19 wherein the user selected display means further includes means for selecting display or non-display of a symbol indicating the location and presence of a non-displayed portion of a data block.

21. A computer system as claimed in claim 20 wherein the symbol includes an indication of the size of the non-displayed portion of the data block.

22. A computer system as claimed in claim 18 wherein said selected portions enabled for retrieval by the second password means are those portions contained within any of the one or more compartments corresponding to the one or more entered compartment passwords.

23. A computer system as claimed in claim 18 wherein said selected portions enabled for retrieval by said second password means are those portions contained within any of the one or more compartments corresponding to the one or more entered compartment passwords and not within compartments corresponding to non-entered compartment passwords.

24. A computer system as claimed in claim 18 wherein said means for bracketing includes means for performing nested bracketing.

25. A computer system as claimed in claim 24 wherein said selected portions enabled for retrieval by the second password means are those portions contained within any of the one or more compartments corresponding to the one or more entered compartment passwords.

26. A computer system as claimed in claim 24 wherein said selected portions enabled for retrieval by said second password means are those portions contained within any of the one or more compartments corresponding to the one or more entered compartment passwords and not within compartments corresponding to non-entered compartment passwords.

27. A computer system for archiving data blocks comprising:
means for forming and appending original data blocks in a diary file;
means for generating a current date;
said original data block forming and appending means including means for appending the current date to the original data blocks when appending in the diary file to form time stamped original data blocks in the diary file;
means for preventing any alteration of the time stamped original data blocks in the diary file;
means for determining if said current date is later than the date of the time stamped data block most recently previously stored in the diary file; and
means responsive to the determining means for preventing said original data block forming and appending means from appending any original data block in the diary file when the determining means determines that the current date is not later than the date of the time stamped data block most recently stored in the diary file.

28. A computer system for archiving data blocks as claimed in claim 27 wherein said original data block forming and appending means includes means for computing an encrypted digital signature of the time-stamped data blocks.

29. A computer system for archiving data blocks as claimed in claim 27 wherein said alteration preventing means includes means for encrypting the original data blocks in the diary file to prevent tampering with the diary file.

30. A computer system for archiving data blocks as claimed in claim 27 including means for computing and storing an authenticity check of the diary file after appending an original data block; means for recomputing the authenticity check of a diary file before appending; means for comparing the recomputed authenticity check with the stored authenticity check; and means responsive to any difference between the recomputed authenticity check and the stored authenticity check for preventing said original data block forming and appending means from appending any original data block to the diary file.

* * * * *